(12) United States Patent
Xi

(10) Patent No.: US 12,115,908 B2
(45) Date of Patent: Oct. 15, 2024

(54) PASSENGER PROTECTION METHOD AND APPARATUS

(71) Applicant: Huawei Technologies Co., Ltd., Shenzhen (CN)

(72) Inventor: Zhipeng Xi, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/680,885

(22) Filed: Feb. 25, 2022

(65) Prior Publication Data

US 2022/0305988 A1    Sep. 29, 2022

Related U.S. Application Data

(63) Continuation of application No. PCT/CN2020/091724, filed on May 22, 2020.

(30) Foreign Application Priority Data

Aug. 30, 2019  (CN) .......................... 201910815590.6
Oct. 18, 2019  (CN) .......................... 201910996188.2

(51) Int. Cl.
*B60Q 9/00*      (2006.01)
*B60R 16/023*    (2006.01)
*B60R 21/015*    (2006.01)
*B60R 21/00*     (2006.01)

(52) U.S. Cl.
CPC ............ *B60Q 9/00* (2013.01); *B60R 16/0232* (2013.01); *B60R 21/01538* (2014.10); *B60R 2021/0027* (2013.01)

(58) Field of Classification Search
CPC .......... B60Q 9/00; B60Q 1/544; B60Q 5/005; B60R 16/0232; B60R 21/01538; B60R 2021/0027; G08B 21/22; G08B 21/24; G08B 29/188; G08B 25/006; G08B 25/016
See application file for complete search history.

(56) References Cited

U.S. PATENT DOCUMENTS

| | | | |
|---|---|---|---|
| 9,014,920 B1 | 4/2015 | Torres et al. | |
| 9,227,484 B1 | 1/2016 | Justice et al. | |
| 10,480,992 B2 * | 11/2019 | Sorimachi | ............ B60N 2/0025 |
| 11,322,009 B1 * | 5/2022 | Johnson | ............ G08B 21/0269 |
| 2006/0020380 A1 | 1/2006 | Saito et al. | |
| 2014/0135598 A1 * | 5/2014 | Weidl | ....................... A61B 5/48 |
| | | | 600/300 |

(Continued)

FOREIGN PATENT DOCUMENTS

| | | |
|---|---|---|
| CN | 105253085 A | 1/2016 |
| CN | 105313819 A | 2/2016 |

(Continued)

*Primary Examiner* — Peter D Nolan
*Assistant Examiner* — Peter Y Ning
(74) *Attorney, Agent, or Firm* — Conley Rose, P.C.

(57) ABSTRACT

A passenger protection method includes obtaining in-vehicle passenger information and in-vehicle environment information; determining an abnormal state type and an abnormality degree based on the in-vehicle passenger information and the in-vehicle environment information; and determining, based on the abnormal state type and the abnormality degree, an emergency measure for reducing the abnormality degree.

20 Claims, 8 Drawing Sheets

(56) References Cited

U.S. PATENT DOCUMENTS

| | | | |
|---|---|---|---|
| 2017/0154513 A1 | 6/2017 | Hariri | |
| 2018/0312032 A1* | 11/2018 | Niemann | B60H 1/00757 |
| 2019/0389329 A1* | 12/2019 | Sherf | B60N 2/274 |
| 2020/0143182 A1* | 5/2020 | Noh | B60W 40/08 |
| 2020/0357285 A1 | 11/2020 | Kim | |
| 2022/0119005 A1* | 4/2022 | Gerrese | G05D 1/0055 |
| 2022/0305988 A1 | 9/2022 | Xi | |
| 2023/0150487 A1* | 5/2023 | Han | B60R 21/01 |
| | | | 701/41 |

FOREIGN PATENT DOCUMENTS

| | | | |
|---|---|---|---|
| CN | 105741485 A | | 7/2016 |
| CN | 107878396 A | | 4/2018 |
| CN | 107933425 A | | 4/2018 |
| CN | 108062847 A | | 5/2018 |
| CN | 108394374 A | | 8/2018 |
| CN | 108791156 A | | 11/2018 |
| CN | 108944672 A | | 12/2018 |
| CN | 208544243 U | | 2/2019 |
| CN | 110001566 A | | 7/2019 |
| CN | 110119684 A | | 8/2019 |
| CN | 110758241 A | | 2/2020 |
| CN | 111931563 A | * | 11/2020 |
| KR | 20190100109 A | | 8/2019 |
| WO | 2015060868 A1 | | 4/2015 |
| WO | WO-2018138728 A1 * | 8/2018 | B60N 2/002 |

* cited by examiner

PASSENGER PROTECTION METHOD AND APPARATUS

CROSS-REFERENCE TO RELATED APPLICATIONS

This is a continuation of International Patent Application No. PCT/CN2020/091724 filed on May 22, 2020, which claims priority to Chinese Patent Application No. 201910815590.6 filed on Aug. 30, 2019 and Chinese Patent Application No. 201910996188.2 filed on Oct. 18, 2019, all of which are hereby incorporated by reference in their entireties.

TECHNICAL FIELD

Embodiments of this application relates to the field of communication technologies, and furthermore, to a passenger protection method and apparatus.

BACKGROUND

In the conventional technology, when a driver leaves a vehicle, other passengers in the vehicle may be trapped in the vehicle due to negligence or the like. When an abnormal condition occurs in the vehicle, the passengers (especially for children) trapped in the vehicle may be unable to leave the vehicle or take effective protection measures due to an unfamiliarity with the vehicle, thereby causing unnecessary casualties.

SUMMARY

This application provides a passenger protection method and apparatus, to reduce or avoid impact of an in-vehicle abnormal condition on a passenger, and protect the in-vehicle passenger.

To achieve the foregoing objective, the following technical solutions are used in this application.

According to a first aspect, an embodiment of this application provides a passenger protection method, where the method is applied to a vehicle, or is applied to an apparatus of another device (such as a cloud server or a mobile phone terminal) that has a function of controlling the vehicle, or a chip system in the vehicle, or an operating system and a drive that run on a processor. The method includes obtaining in-vehicle passenger information and in-vehicle environment information, where the in-vehicle passenger information includes one or more pieces of in-vehicle passenger behavior information and in-vehicle passenger voice information, and the in-vehicle environment information includes one or more pieces of in-vehicle environment image information, in-vehicle environment sound information, in-vehicle air quality information, and in-vehicle temperature information, determining an abnormal state type and an abnormality degree based on the in-vehicle passenger information and the in-vehicle environment information, where the abnormal state type includes an in-vehicle passenger abnormality and/or an in-vehicle environment abnormality, the in-vehicle passenger abnormality includes one or more of an in-vehicle passenger behavior abnormality and an in-vehicle passenger voice abnormality, and the in-vehicle environment abnormality includes one or more of an in-vehicle environment image abnormality, an in-vehicle environment sound abnormality, an in-vehicle air quality abnormality, and an in-vehicle temperature abnormality, and determining an emergency measure based on the abnormal state type and the abnormality degree, where the emergency measure is an operation for reducing the abnormality degree.

By using the passenger protection method, the in-vehicle passenger information and the in-vehicle environment information are obtained, then the abnormal state type and the abnormality degree are determined based on the in-vehicle passenger information and the in-vehicle environment information, and further, the emergency measure is determined based on the abnormal state type and the abnormality degree. In the foregoing process, after the abnormal state type and the abnormality degree in the vehicle are determined, a corresponding emergency measure is further taken to reduce or avoid impact of an in-vehicle abnormal condition on a passenger, thereby protecting the in-vehicle passenger.

In a possible design, obtaining in-vehicle passenger information and in-vehicle environment information includes obtaining first data and second data that are monitored by a sensor, where the sensor includes one or more of a seat pressure sensor, a camera, a sound sensor, an air quality sensor, and a temperature sensor, determining the in-vehicle passenger information based on the first data, where the first data includes at least one of in-vehicle seat pressure data, in-vehicle passenger image data, and in-vehicle passenger voice data, and determining the in-vehicle environment information based on the second data, where the second data includes at least one of in-vehicle environment image data, in-vehicle environment sound data, in-vehicle air quality data, and in-vehicle temperature data.

When the first data and the second data that are monitored by the sensor are analyzed, to determine the in-vehicle passenger information and the in-vehicle environment information, if a relatively large quantity of sensors and a relatively large quantity of types of sensors are involved, relatively abundant first data and second data are obtained, and the in-vehicle passenger information and the in-vehicle environment information are relatively accurately determined.

In a possible design, a passenger protection mode is triggered by using a wake-up signal. The wake-up signal includes at least one of in-vehicle seat pressure data that exceeds a preset pressure threshold and that lasts for more than preset duration, and in-vehicle passenger voice data that exceeds a preset decibel threshold.

In the passenger protection mode, the in-vehicle passenger can be protected more systematically. Therefore, by using the foregoing process, safety of the in-vehicle passenger can be better ensured, and unnecessary casualties can be reduced.

In a possible design, after the passenger protection mode is triggered, a vehicle driving system works at a preset low frequency, and determines the in-vehicle passenger information based on the first data, and determines the in-vehicle environment information based on the second data, and/or controls at least one of a driving function and an entertainment function to be disabled.

By using the foregoing process, in this embodiment of this application, the vehicle driving system can work with low power consumption in the passenger protection mode, thereby saving resources.

In a possible design, the in-vehicle passenger behavior information includes an in-vehicle passenger location, an in-vehicle passenger posture, and an in-vehicle passenger facial expression. The in-vehicle passenger location includes a front seat and a back seat. The in-vehicle passenger posture includes sitting up, curling up, and lying. The in-vehicle passenger facial expression includes normal, happy, sad, angry, anxious, or uncomfortable. The in-vehicle passenger voice information includes an in-vehicle passenger volume, an in-vehicle passenger voiceprint, and in-vehicle passenger voice semantic information. The in-vehicle passenger voice semantic information includes seeking help, singing, and making a call. The in-vehicle environment image information includes normal, fire, a vehicle accident, and the like.

In a possible design, determining an abnormal state type based on the in-vehicle passenger information and the in-vehicle environment information includes, if the in-vehicle passenger posture is curling up or lying, and the in-vehicle passenger facial expression is uncomfortable, determining that the abnormal state type is an in-vehicle passenger behavior abnormality, if the in-vehicle passenger volume exceeds a first preset decibel threshold corresponding to the in-vehicle passenger voiceprint and/or the in-vehicle passenger voice semantic information includes seeking help information, determining that the abnormal state type is an in-vehicle passenger voice abnormality, if the in-vehicle environment image information is fire or a vehicle accident, determining that the abnormal state type is an in-vehicle environment image abnormality, if the in-vehicle environment sound information exceeds a second preset decibel threshold, determining that the abnormal state type is an in-vehicle environment sound abnormality, if in-vehicle air quality exceeds a preset air quality threshold, determining that the abnormal state type is an in-vehicle air quality abnormality, or if an in-vehicle temperature exceeds a preset temperature threshold, determining that the abnormal state type is an in-vehicle temperature abnormality.

In a possible design, determining an abnormality degree based on the in-vehicle passenger information and the in-vehicle environment information includes fusing the in-vehicle passenger information and the in-vehicle environment information in a same time period to obtain fusion information used to describe a current in-vehicle scenario, and analyzing the fusion information to determine an abnormality degree used to indicate impact of the current in-vehicle scenario on a passenger.

In a possible design, the analyzing the fusion information to determine an abnormality degree includes, if the current in-vehicle scenario described by the fusion information is that a baby is crying, the abnormality degree is low, if the current in-vehicle scenario described by the fusion information is that a baby is crying and the in-vehicle temperature is abnormal, the abnormality degree is relatively high, or if the current in-vehicle scenario described by the fusion information is that a baby is crying and fire breaks out in the vehicle, the abnormality degree is high.

In a possible design, the emergency measure includes emergency communication and/or an emergency control measure. Communication content of the emergency communication includes one or more pieces of vehicle location information, vehicle appearance information, license plate number information, in-vehicle status information, in-vehicle image data, in-vehicle sound information, status information of a sensor with abnormal data, and the emergency control measure. A communication manner of the emergency communication is one or more of a Short Message Service (SMS) message, a multimedia message, and a voice call. The emergency control measure includes one or more of reminding an in-vehicle passenger by using voice, opening a window, opening a door, opening an in-vehicle air purification device, opening a temperature regulation device, opening a fire extinguishing apparatus, unlocking/opening a door, sounding the horn, and flashing a vehicle lamp.

In a possible design, determining an emergency measure based on the abnormal state type and the abnormality degree includes, if the abnormality degree is low, determining that the emergency measure is emergency communication, where a contact of the emergency communication is a first preset emergency contact, if the abnormality degree is relatively high, determining that the emergency measure is emergency communication and an emergency control measure, where a contact of the emergency communication is a first preset emergency contact, and the emergency control measure is determined based on the abnormal state type, or if the abnormality degree is high, the emergency measure is emergency communication and an emergency control measure, where contacts of the emergency communication include a first preset emergency contact and a second preset emergency contact, and the emergency control measure is determined based on the abnormal state type.

In a possible design, that the emergency control measure is determined based on the abnormal state type includes, if the abnormal state type is an in-vehicle air quality abnormality, the emergency control measure is at least one of opening a window, opening a door, and opening an in-vehicle air purification device, if the abnormal state type is an in-vehicle temperature abnormality, the emergency control measure is at least one of opening a window, opening a door, and opening a temperature regulation device, if the abnormal state type is an in-vehicle passenger behavior abnormality and/or an in-vehicle passenger voice abnormality, the emergency control measure is at least one of reminding an in-vehicle passenger by using voice, opening a window, opening a door, opening a temperature regulation device, opening a fire extinguishing apparatus, unlocking/opening a door, sounding the horn, and flashing a vehicle lamp, or if the abnormal state type is an in-vehicle environment image abnormality and/or an in-vehicle environment sound abnormality, the emergency control measure is at least one of reminding an in-vehicle passenger by using voice, opening a window, opening a door, opening a temperature regulation device, opening a fire extinguishing apparatus, unlocking/opening a door, sounding the horn, and flashing a vehicle lamp.

According to a second aspect, an embodiment of this application provides a passenger protection apparatus, where the apparatus is applied to a vehicle, or is applied to another device (such as a cloud server or a mobile phone terminal) that has a function of controlling the vehicle, a chip system in the vehicle, or an operating system and a drive that run on a processor, and the apparatus includes an obtaining unit and a processing unit. The obtaining unit is configured to obtain in-vehicle passenger information and in-vehicle environment information, where the in-vehicle passenger information includes one or more pieces of in-vehicle passenger behavior information and in-vehicle passenger voice information, and the in-vehicle environment information includes one or more pieces of in-vehicle environment image information, in-vehicle environment sound information, in-vehicle air quality information, and in-vehicle temperature information. The processing unit is configured to determine an abnormal state type and an abnormality degree based on the in-vehicle passenger information and the in-vehicle environment information, where the abnormal state type includes an in-vehicle passenger abnormality and/or an in-vehicle environment abnormality, the in-vehicle passenger abnormality includes one or more of an in-vehicle passenger behavior abnormality and an in-vehicle passenger voice abnormality, and the in-vehicle environment abnormality includes one or more of an in-vehicle environment image abnormality, an in-vehicle environment sound abnormality, an in-vehicle air quality abnormality, and an in-vehicle temperature abnormality, and determine an emergency measure based on the abnormal state type and the abnormality degree, where the emergency measure is an operation for reducing the abnormality degree.

In a possible design, the obtaining unit is configured to obtain first data and second data that are monitored by a sensor, where the sensor includes one or more of a seat pressure sensor, a camera, a sound sensor, an air quality sensor, and a temperature sensor, determine the in-vehicle passenger information based on the first data, where the first data includes at least one of in-vehicle seat pressure data, in-vehicle passenger image data, and in-vehicle passenger voice data, and determine the in-vehicle environment information based on the second data, where the second data includes at least one of in-vehicle environment image data, in-vehicle environment sound data, in-vehicle air quality data, and in-vehicle temperature data.

In a possible design, the processing unit is further configured to trigger a passenger protection mode by using a wake-up signal. The wake-up signal includes at least one of in-vehicle seat pressure data that exceeds a preset pressure threshold and that lasts for more than preset duration, and in-vehicle passenger voice data that exceeds a preset decibel threshold.

In a possible design, the processing unit is further configured to work at a preset low frequency, and determine the in-vehicle passenger information based on the first data, and determine the in-vehicle environment information based on the second data, and/or control at least one of a driving function and an entertainment function to be disabled.

In a possible design, the in-vehicle passenger behavior information includes an in-vehicle passenger location, an in-vehicle passenger posture, and an in-vehicle passenger facial expression. The in-vehicle passenger location includes a front seat and a back seat. The in-vehicle passenger posture includes sitting up, curling up, and lying. The in-vehicle passenger facial expression includes normal, happy, sad, angry, anxious, or uncomfortable. The in-vehicle passenger voice information includes an in-vehicle passenger volume, an in-vehicle passenger voiceprint, and in-vehicle passenger voice semantic information. The in-vehicle passenger voice semantic information includes seeking help, singing, and making a call. The in-vehicle environment image information includes normal, fire, a vehicle accident, and the like.

In a possible design, the processing unit is configured to, if the in-vehicle passenger posture is curling up or lying, and the in-vehicle passenger facial expression is uncomfortable, determine that the abnormal state type is an in-vehicle passenger behavior abnormality, if the in-vehicle passenger volume exceeds a first preset decibel threshold corresponding to the in-vehicle passenger voiceprint and/or the in-vehicle passenger voice semantic information includes seeking help information, determine that the abnormal state type is an in-vehicle passenger voice abnormality, if the in-vehicle environment image information is fire or a vehicle accident, determine that the abnormal state type is an in-vehicle environment image abnormality, if the in-vehicle environment sound information exceeds a second preset decibel threshold, determine that the abnormal state type is an in-vehicle environment sound abnormality, if in-vehicle air quality exceeds a preset air quality threshold, determine that the abnormal state type is an in-vehicle air quality abnormality, or if an in-vehicle temperature exceeds a preset temperature threshold, determine that the abnormal state type is an in-vehicle temperature abnormality.

In a possible design, the processing unit is further configured to fuse the in-vehicle passenger information and the in-vehicle environment information in a same time period to obtain fusion information used to describe a current in-vehicle scenario, and analyze the fusion information to determine the abnormality degree used to indicate impact of the current in-vehicle scenario on a passenger.

In a possible design, the processing unit is further configured to, if the current in-vehicle scenario described by the fusion information is that a baby is crying, the abnormality degree is low, if the current in-vehicle scenario described by the fusion information is that a baby is crying and the in-vehicle temperature is abnormal, the abnormality degree is relatively high, or if the current in-vehicle scenario described by the fusion information is that a baby is crying and fire breaks out in the vehicle, the abnormality degree is high.

In a possible design, the emergency measure includes emergency communication and/or an emergency control measure. Communication content of the emergency communication includes one or more pieces of vehicle location information, vehicle appearance information, license plate number information, in-vehicle status information, in-vehicle image data, in-vehicle sound information, status information of a sensor with abnormal data, and the emergency control measure. A communication manner of the emergency communication is one or more of an SMS message, a multimedia message, and a voice call. The emergency control measure includes one or more of reminding an in-vehicle passenger by using voice, opening a window, opening a door, opening an in-vehicle air purification device, opening a temperature regulation device, opening a fire extinguishing apparatus, unlocking/opening a door, sounding the horn, and flashing a vehicle lamp.

In a possible design, the processing unit is further configured to, if the abnormality degree is low, determine that the emergency measure is emergency communication, where a contact of the emergency communication is a first preset emergency contact, if the abnormality degree is relatively high, determine that the emergency measure is emergency communication and an emergency control measure, where a contact of the emergency communication is a first preset emergency contact, and the emergency control measure is determined based on the abnormal state type, or if the abnormality degree is high, the emergency measure is emergency communication and an emergency control measure, where contacts of the emergency communication include a first preset emergency contact and a second preset emergency contact, and the emergency control measure is determined based on the abnormal state type.

In a possible design, the processing unit is further configured to, if the abnormal state type is an in-vehicle air quality abnormality, the emergency control measure is at least one of opening a window, opening a door, and opening an in-vehicle air purification device, if the abnormal state type is an in-vehicle temperature abnormality, the emergency control measure is at least one of opening a window, opening a door, and opening a temperature regulation device, if the abnormal state type is an in-vehicle passenger behavior abnormality and/or an in-vehicle passenger voice abnormality, the emergency control measure is at least one of reminding an in-vehicle passenger by using voice, opening a window, opening a door, opening a temperature regulation device, opening a fire extinguishing apparatus, unlocking/opening a door, sounding the horn, and flashing a vehicle lamp, or if the abnormal state type is an in-vehicle environment image abnormality and/or an in-vehicle environment sound abnormality, the emergency control measure is at least one of reminding an in-vehicle passenger by using voice, opening a window, opening a door, opening a temperature regulation device, opening a fire extinguishing apparatus, unlocking/opening a door, sounding the horn, and flashing a vehicle lamp.

According to a third aspect, a passenger protection apparatus is provided and includes a processor, a memory, and a communication interface, where the communication interface is configured to communicate with another device or a communication network, the memory is configured to store computer-executable instructions, and when the passenger protection apparatus runs, the processor executes the computer-executable instructions stored in the memory, to enable the passenger protection apparatus to perform the passenger protection method according to any one of the foregoing first aspect and the first aspect.

According to a fourth aspect, an embodiment of this application further provides a computer-readable storage medium, including instructions, and when the instructions are run on a computer, the computer is enabled to perform the passenger protection method according to any one of the foregoing first aspect and the first aspect.

According to a fifth aspect, an embodiment of this application further provides a computer program product including instructions, where when the computer program product is run on a computer, the computer is enabled to perform the passenger protection method according to any one of the foregoing first aspect and the first aspect.

DESCRIPTION OF EMBODIMENTS

A passenger protection method provided in embodiments of this application is applied to a vehicle, or is applied to another device (such as a cloud server or a mobile phone terminal) that has a function of controlling the vehicle. The vehicle may be a self-driving vehicle, and the self-driving vehicle may be a vehicle that has a partial self-driving function, or may be a vehicle that has a full self-driving function. That is, a self-driving level of the vehicle may be classified into no automation (L0), driver assistance (L1), partial automation (L2), conditional automation (L3), high automation (L4), or full automation (L5) based on a classification standard of the Society of Automotive Engineers (SAE). A vehicle or another device (such as a cloud server or a mobile phone terminal) may implement, by using a component (including hardware and software) included in the vehicle or the other device, the passenger protection method provided in the embodiments of this application, to obtain in-vehicle passenger information and in-vehicle environment information, determine an abnormal state type and an abnormality degree in the vehicle based on the obtained information, and then determine a corresponding emergency measure, so as to reduce the abnormality degree.

Figure 1:
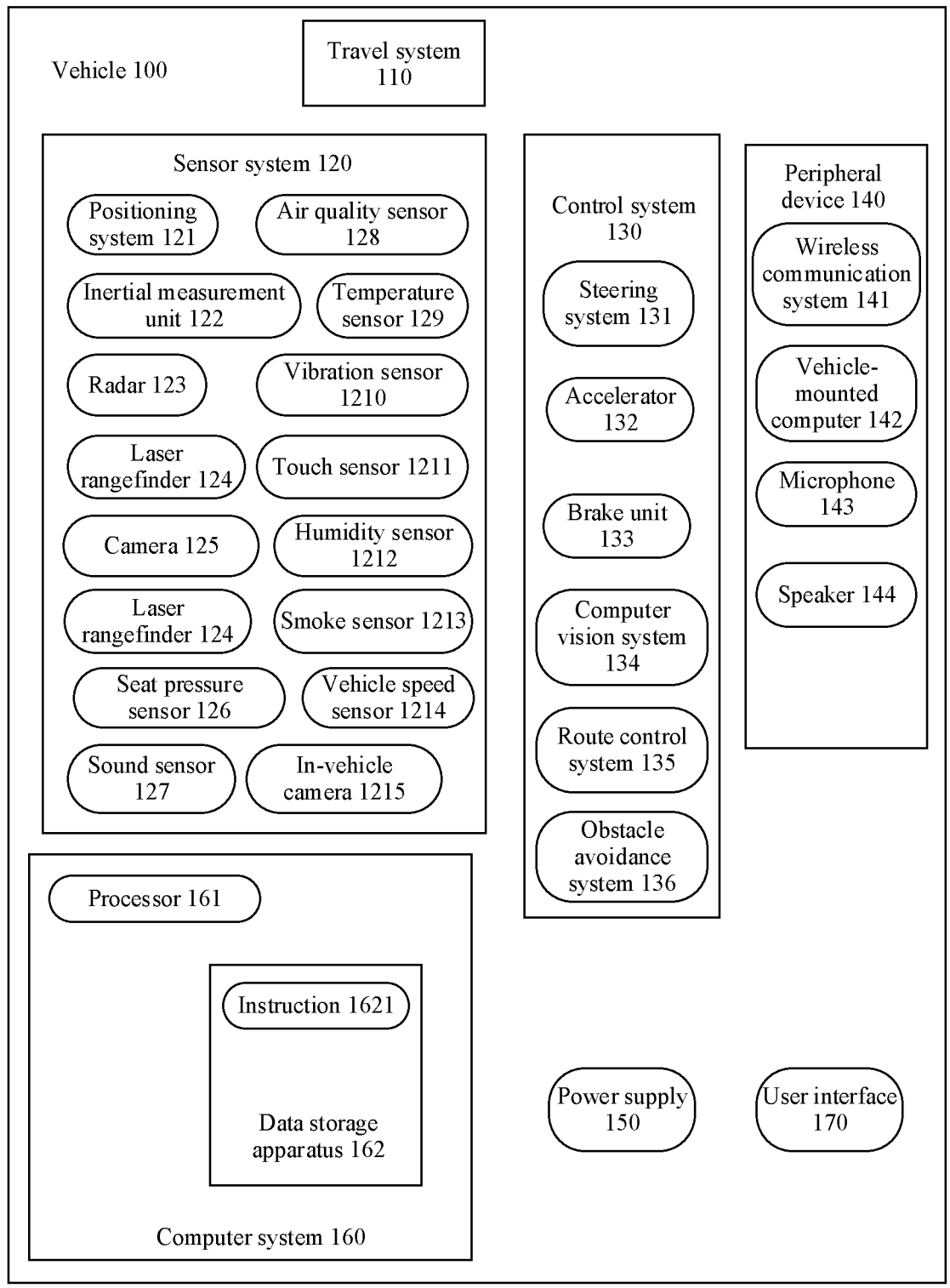
FIG. 1 is a schematic structural diagram of a self-driving vehicle according to an embodiment of this application.

For example, the vehicle is a self-driving vehicle. FIG. 1 is a functional block diagram of a vehicle 100 according to an embodiment of this application. The vehicle 100 may include various subsystems, such as a travel system 110, a sensor system 120, a control system 130, one or more peripheral devices 140, a power supply 150, a computer system 160, and a user interface 170. In some embodiments, the vehicle 100 may include more or fewer subsystems, and each subsystem may include a plurality of elements. In addition, each subsystem and element of the vehicle 100 may be interconnected in a wired or wireless manner.

The travel system 110 may include a component that powers the vehicle 100 for movement. In an embodiment, the travel system 110 may include an engine, an energy source, a transmission device, and a wheel. The engine may be an internal combustion engine, a motor, an air compression engine, or a combination with other types of engines. The engine can convert the energy source into mechanical energy. There are many types of energy sources, such as gasoline, diesel, other petroleum-based fuel, propane, other compressed gas-based fuel, anhydrous alcohol, solar panels, batteries, and other power sources. The energy source may also provide energy for another subsystem of the vehicle 100. The transmission device may transmit mechanical power from the engine to the wheel to change a rotational speed of the wheel, and the like. The transmission device may include at least one of devices such as a gearbox, a differential, and a drive shaft, where the drive shaft may be coupled to one or more axes of one or more wheels. In an embodiment, the transmission device may further include another device, such as a clutch.

The sensor system 120 may include several sensors that sense surrounding environment information of the vehicle 100. For example, the sensor system 120 includes at least one of a positioning system 121 (such as a Global Positioning System (GPS) system, a BEIDOU system, or another positioning system), an inertial measurement unit (IMU) 122, a radar 123, a laser rangefinder 124, a camera 125, and the like.

The positioning system 121 may be configured to estimate a geographical location of the vehicle 100. The IMU 122 is configured to sense location and orientation changes of the vehicle 100 based on an inertial acceleration speed. In an embodiment, the IMU 122 may be a combination of an accelerometer and a gyroscope. The radar 123 may sense an object in a surrounding environment of the vehicle 100 by using a radio signal, and the radar 123 may be further configured to sense a speed and/or a heading direction of the object in addition to sensing the object. The laser rangefinder 124 may sense, by using a laser, an object in an environment in which the vehicle 100 is located. In some embodiments, the laser rangefinder 124 may include one or more laser sources, a laser scanner, and one or more detectors, and another system component. The camera 125 may be configured to capture a plurality of images of the surrounding environment of the vehicle 100, and the camera 125 may be a static camera or a video camera.

The sensor system 120 further includes sensors of an internal system of the vehicle 100. In this embodiment of this application, the sensors of the internal system of the vehicle 100 include sensors such as an in-vehicle camera 1215, a seat pressure sensor 126, a sound sensor 127, an air quality sensor 128, a temperature sensor 129, a vibration sensor 1210, a touch sensor 1211, a humidity sensor 1212, a smoke sensor 1213, and a vehicle speed sensor 1214. The in-vehicle camera 1215 may be configured to capture a plurality of images of an in-vehicle passenger and a plurality of images of an in-vehicle environment. The seat pressure sensor 126 may be configured to monitor pressure data on each in-vehicle seat. The sound sensor 127 may be configured to monitor in-vehicle passenger voice data and in-vehicle environment sound data. The air quality sensor 128 may be configured to monitor in-vehicle air quality, and obtain related air quality data. The temperature sensor 129 is configured to monitor an in-vehicle temperature. The vibration sensor 1210 is configured to capture vibration data generated in the vehicle. The touch sensor 1211 is configured to monitor touch data on a display screen of an in-vehicle central control unit. The humidity sensor 1212 is configured to monitor in-vehicle humidity data. The smoke sensor 1213 is configured to monitor in-vehicle smoke concentration data. The vehicle speed sensor 1214 is configured to monitor vehicle speed data to determine whether the vehicle is in a still state. In addition, the sensors of the internal system of the vehicle may further include an air quality sensor, a fuel gauge, an engine oil temperature gauge, and the like. One or more pieces of sensor data collected by these sensors may be used to detect an object and its corresponding characteristics (location, shape, temperature, speed, and the like). The detection and identification is a key to implementing safe operations of the vehicle 100 and ensuring safety of the in-vehicle passenger.

The control system 130 may control operations of the vehicle 100 and its components. The control system 130 may include various elements such as at least one of a steering system 131, an accelerator 132, a brake unit 133, a computer vision system 134, a route control system 135, and an obstacle avoidance system 136.

The steering system 131 is configured to adjust a heading direction of the vehicle 100. For example, the steering system 131 may be a steering wheel system.

The accelerator 132 further controls the speed of the vehicle 100 by controlling an operating speed of the engine.

The brake unit 133 is configured to control the vehicle 100 to decelerate, and the brake unit 133 may reduce the rotational speed of the wheel by using a friction force. In some embodiments, the brake unit 133 may reduce the rotational speed of the wheel by converting a kinetic energy of the wheel into a current, or the brake unit 133 may reduce the rotational speed of the wheel in another form, to control the speed of the vehicle 100.

In this embodiment of this application, the computer vision system 134 may process and analyze images captured by the camera 125 and the in-vehicle camera 1215, to identify an object in the surrounding environment of the vehicle 100 and/or a feature of the object, and in-vehicle passenger behavior information and in-vehicle environment image information of the vehicle 100. The object in the surrounding environment of the vehicle 100 and/or the feature of the object include a traffic signal, a road boundary, an obstacle, and the like. In the vehicle 100, in-vehicle passenger information includes information such as an in-vehicle passenger facial expression and an in-vehicle passenger posture. In some embodiments, the computer vision system 134 may complete operations such as drawing an environment map, tracking an object, estimating an object speed, and determining an in-vehicle current condition by using at least one of an object identification algorithm, a structure from motion (SFM) algorithm, video tracking, or another computer vision technology.

The route control system 135 is configured to determine a driving route of the vehicle 100. In some embodiments, the route control system 135 may determine the driving route of the vehicle 100 in combination with sensor data from the sensor system 120 and one or more pieces of preset map data.

The obstacle avoidance system 136 is configured to identify and evaluate an obstacle and plan a manner to cross a potential obstacle in the surrounding environment of the vehicle 100, such as making a detour for avoidance.

Certainly, in some embodiments, the control system 130 may add another component other than the foregoing components, or may reduce a part of the foregoing components, or replace the foregoing components with other components.

The vehicle 100 interacts with the peripheral device 140 such as an external sensor, another vehicle, or another computer system by using the user interface 170. The peripheral device 140 may include at least one of a wireless communication system 141, a vehicle-mounted computer 142, a microphone 143, a speaker 144, and/or another peripheral device. For example, the vehicle-mounted computer 142 may provide information to the vehicle 100 or a user of the vehicle 100 by using the user interface 170, and receive information from the vehicle 100 or the user of the vehicle 100. In some embodiments, the vehicle-mounted computer 142 may be operated by using a display screen. In another case, the user interface 170 may further provide a means for the vehicle 100 to communicate with another device located in the vehicle 100. For example, the microphone 143 may receive audio (for example, a voice command or another audio input) from the user of the vehicle 100 through the user interface 170. Similarly, the speaker 144 may output audio to the user of the vehicle 100 through the user interface 170.

The wireless communication system 141 may be configured to communicate wirelessly with one or more devices by using a communication network or directly. For example, the wireless communication system 141 may use third generation (3G) cellular communication, such as code-division multiple access (CDMA), Evolution-Data Optimized (EVDO), Global System for Mobile Communications (GSM)/General Packet Radio Service (GPRS), or fourth generation (4G) cellular communication, such as Long-Term Evolution (LTE), or fifth generation (5G) cellular communication, or the wireless communication system 141 may use WI-FI or another wireless protocol to communicate with a wireless local area network (WLAN). In some embodiments, the wireless communication system 141 may communicate directly with devices, such as various vehicle communication systems, by using an infrared link, BLUETOOTH, or ZIGBEE. In some embodiments, the wireless communication system 141 may include one or more dedicated short-range communications (DSRC) devices.

The power supply 150 may provide power to various components of the vehicle 100. In an embodiment, the power supply 150 may be a rechargeable lithium ion or lead-acid battery, and one or more battery packs of such batteries are configured as a power supply to provide power to various components of the vehicle 100. In some embodiments, for example, in some all-electric or battery electric vehicles, the power supply 150 and the energy source may be implemented together.

Some or all of functions of the vehicle 100 are controlled by the computer system 160. The computer system 160 may include at least one processor 161. The processor 161 executes instructions 1621 stored in a non-transitory computer-readable medium such as a data storage apparatus 162. The computer system 160 may further control a plurality of computer devices in an individual component or subsystem of the vehicle 100 in a distributed manner. The processor 161 may be any conventional processor, such as a commercially available central processing unit (CPU). In some embodiments, the processor may be a dedicated device of an application-specific integrated circuit (ASIC) or another hardware-based processor. Although FIG. 1 functionally shows a processor, a memory, and other elements in a same physical housing, a person of ordinary skill in the art should understand that the processor, the computer system, or the memory may actually include a plurality of processors, computer systems, or memories that may be stored in the same physical housing, or may include a plurality of processors, computer systems, or memories that may not be stored in the same physical housing. For example, the memory may be a hard disk drive or another storage medium located in a different physical housing. Therefore, references to the processor or the computer system will be understood as including references to a set of processors or computer systems or memories that can be operated in parallel, or references to a set of processors or computer systems or memories that may not be operated in parallel. Unlike using a single processor to perform the steps described herein, some components, such as a steering component and a deceleration component, may have respective processors. The processor performs only calculation related to component-specific functions.

In various aspects described herein, the processor may be remote from the vehicle and communicate wirelessly with the vehicle. In another aspect, some of processes described herein are performed by a processor disposed in the vehicle, and others are performed by a remote processor, including taking necessary steps to perform a single operation.

In some embodiments, the data storage apparatus 162 may include an instruction 1621 (for example, program logic), and the instruction 1621 may be executed by the processor 161 to perform various functions of the vehicle 100, including those functions described above. The data storage apparatus 162 may also include additional instructions, including instructions to send data to, receive data from, interact with, and/or control one or more of the travel system 110, the sensor system 120, the control system 130, and the peripheral device 140.

In addition to the instruction 1621, the data storage apparatus 162 may further store data, such as a road map, route information, a location and/or a direction and/or a speed of the vehicle 100, data of another vehicle, and other information. When the vehicle 100 is in an autonomous, semi-autonomous, and/or manual driving mode, the data and the related information may be used by the vehicle 100 and the computer system 160.

For example, in this embodiment of this application, the data storage apparatus 162 obtains the in-vehicle environment information and the in-vehicle passenger information from the sensor system 120 or another component of the vehicle 100, where the in-vehicle environment information may be, for example, in-vehicle environment image information, such as fire or in-vehicle air quality information, and the in-vehicle passenger information may be in-vehicle passenger behavior information, in-vehicle passenger voice information and/or the like. The data storage apparatus 162 may further store status information of the vehicle itself and status information of another vehicle that interacts with the vehicle, where the status information of the vehicle includes but is not limited to the speed of the vehicle, an internal scenario of the vehicle, and the like. In addition to the foregoing content, the data storage apparatus 162 may further obtain information such as a distance between an obstacle in the surrounding environment and the vehicle, where the information is obtained by the vehicle based on a speed measurement function and a distance measurement function of the radar 123. In this way, the processor 161 may obtain the information from the data storage apparatus 162, and obtain a final emergency policy based on environment information of the vehicle, the status information of the vehicle itself, and a conventional emergency policy, so as to control the vehicle 100 to take an emergency measure to alleviate an in-vehicle abnormal state.

The user interface 170 is configured to provide information to or receive information from the user of the vehicle 100. In some embodiments, the user interface 170 may interact with one or more input/output devices in a set of peripheral devices 140, such as one or more of the wireless communication system 141, the vehicle-mounted computer 142, the microphone 143, and the speaker 144.

The computer system 160 may control the vehicle 100 based on information obtained from various subsystems (for example, the travel system 110, the sensor system 120, and the control system 130) and information received from the user interface 170. For example, the computer system 160 may control the steering system 131 to change the heading direction of the vehicle based on information from the control system 130, thereby avoiding obstacles detected by the sensor system 120 and the obstacle avoidance system 136. In some embodiments, the computer system 160 may control many aspects of the vehicle 100 and its subsystems.

In some embodiments, one or more of the foregoing components may be separately installed or associated with the vehicle 100. For example, the data storage apparatus 162 may partially or completely exist separately from the vehicle 100. The foregoing components may be coupled together for communication in a wired and/or wireless manner.

In some embodiments, the foregoing components are merely examples. In actual application, components in the foregoing modules may be added or deleted based on an actual requirement. FIG. 1 should not be understood as a limitation on this embodiment of this application.

In this embodiment of this application, a self-driving vehicle, such as the vehicle 100, may determine an adjustment instruction for a current vehicle-mounted device status based on the in-vehicle environment information and the in-vehicle passenger information. A passenger in the vehicle 100 may be a baby, a teenager, an adult, an old person, or the like. In some examples, each passenger in the vehicle may be independently considered, and emergency communication and an emergency control measure of the vehicle 100 may be determined based on respective characteristics of the passenger, such as voiceprint information and an in-vehicle passenger volume.

In some embodiments, the vehicle 100 that is a self-driving vehicle or a computer device associated with the vehicle (such as the computer system 160, the computer vision system 134, and the data storage apparatus 162 in FIG. 1) may determine an abnormal state type and an abnormality degree in the vehicle based on the identified passenger information and in-vehicle environment information (such as vehicle sliding and fire), and determine a corresponding emergency communication measure. In some embodiments, there is an association relationship between the in-vehicle passenger information and the in-vehicle environment information. Therefore, the identified in-vehicle passenger information and in-vehicle environment information may be considered as a whole to predict an abnormality degree of an in-vehicle condition. The vehicle 100 can determine communication content, a communication object, and a communication manner of emergency communication based on the abnormality degree of the identified in-vehicle condition. In this process, another factor may also be considered to determine an emergency communication instruction of the vehicle 100, such as the location of the vehicle 100, an environment outside the vehicle, and the speed of the vehicle. In other words, the self-driving vehicle can determine, based on the identified in-vehicle passenger information and in-vehicle environment information, what kind of emergency communication needs to be used by the vehicle (for example, a communication manner of the emergency communication is an SMS message or a call, or a contact of the emergency communication is a driver or an emergency center).

In addition to providing an instruction for instructing the self-driving vehicle to perform emergency communication, the computer device may further provide an instruction for adjusting statuses of various devices in the vehicle 100, so that the self-driving vehicle adjusts the statuses of various devices in the vehicle based on a given emergency control measure, to ensure safety of the in-vehicle passenger.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of this application.

Figure 2:
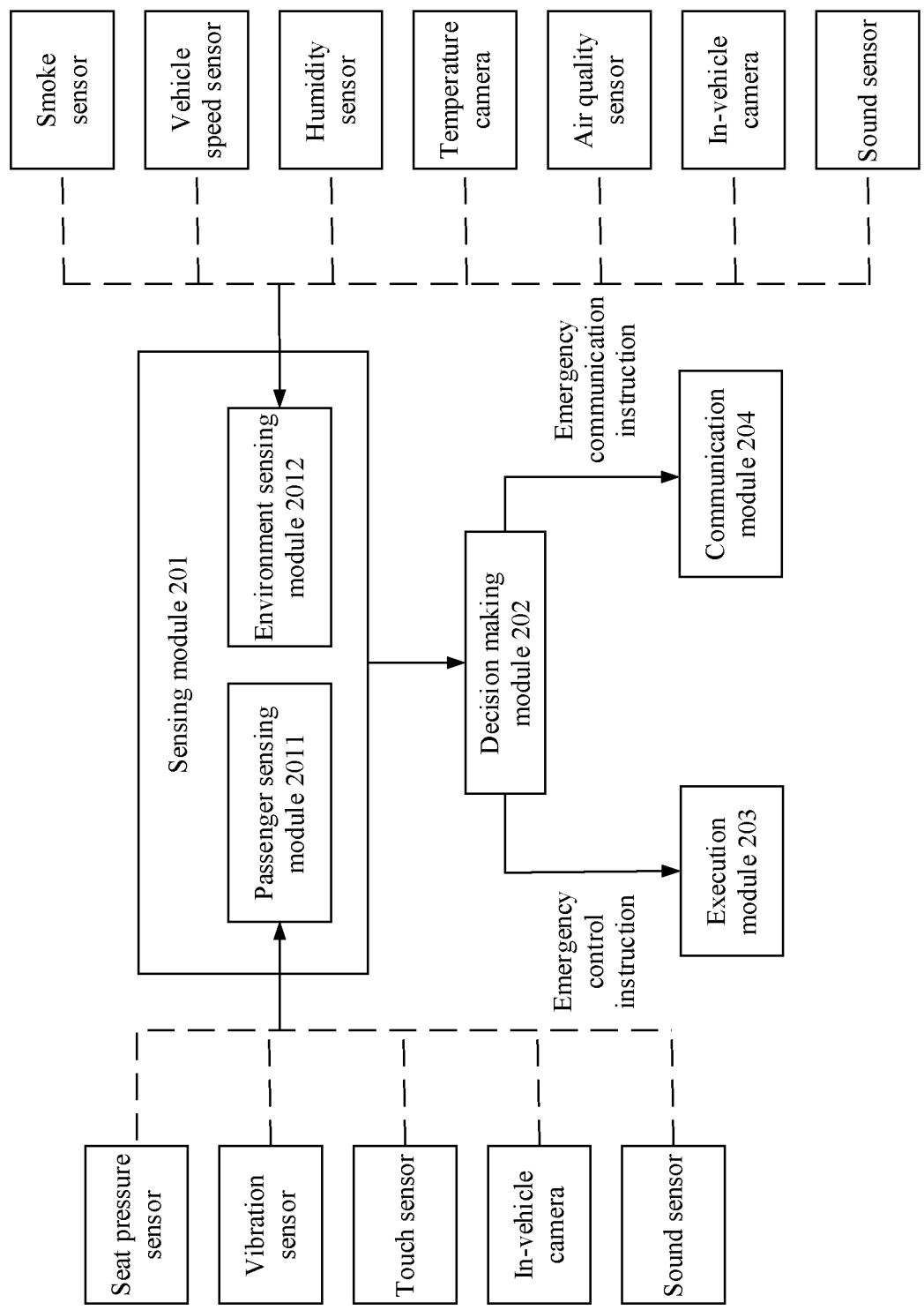
FIG. 2 is a schematic structural diagram of a self-driving vehicle according to an embodiment of this application.

Referring to FIG. 2, for example, the vehicle may include the following modules: a sensing module 201, a decision making module 202, an execution module 203, and a communication module 204.

The sensing module 201 is configured to obtain data monitored by a sensor in the vehicle, and process the obtained data to determine in-vehicle passenger information and in-vehicle environment information. The sensing module 201 may be divided into a passenger sensing module 2011 and an environment sensing module 2012. For an interaction relationship between both the passenger sensing module 2011 and the environment sensing module 2012 and a vehicle-mounted device (each sensor), refer to FIG. 2. An arrow in the figure indicates that a sensor transmits data to the passenger sensing module 2011 or the environment sensing module 2012, and sensors connected to a same dashed line have an "and/or" relationship. The passenger sensing module 2011 obtains first data by using an in-vehicle camera, a seat pressure sensor, a sound sensor, a vibration sensor, and a touch sensor, where the first data includes in-vehicle passenger image data, in-vehicle seat pressure data, in-vehicle passenger voice data, in-vehicle seat vibration data, and in-vehicle display screen touch data. The environment sensing module 2012 obtains second data by using the in-vehicle camera, the sound sensor, an air quality sensor, a temperature sensor, a humidity sensor, a smoke sensor, and a vehicle speed sensor, where the second data includes in-vehicle environment image data, in-vehicle environment sound data, in-vehicle air quality data, in-vehicle temperature data, in-vehicle humidity data, in-vehicle smoke concentration data, and vehicle speed data. In addition, the sensing module 201 may analyze the obtained first data and second data to obtain the in-vehicle passenger information and the in-vehicle environment information, and transmit the information to the decision making module 202, so as to deliver an emergency communication instruction and/or an emergency control instruction.

The decision making module 202 is configured to receive the in-vehicle passenger information and the in-vehicle environment information that are sent by the sensing module 201, analyze the received information, and when an in-vehicle condition is abnormal, determine an abnormal state type of the in-vehicle condition, fuse the in-vehicle passenger information and the in-vehicle environment information in a same time period, to obtain fusion information that describes a current in-vehicle scenario, analyze the fusion information to determine the abnormality degree of the vehicle condition, and further determine an emergency measure based on the abnormal state type and the abnormality degree in the vehicle, where the emergency measure includes emergency communication and/or an emergency control measure, deliver a corresponding emergency control instruction to the execution module 203, and deliver an emergency communication instruction to the communication module 204.

The execution module 203 is configured to receive the emergency control instruction delivered by the decision making module 202, and execute a corresponding emergency control measure.

The communication module 204 is configured to receive the emergency communication instruction sent by the decision making module 202, establish an information transmission channel between a vehicle driving system and a driver or another preset emergency contact and/or social emergency organization, and transmit information that helps a communication object to evaluate an abnormal state of the vehicle and/or facilitates rescue implementation.

Figure 3:
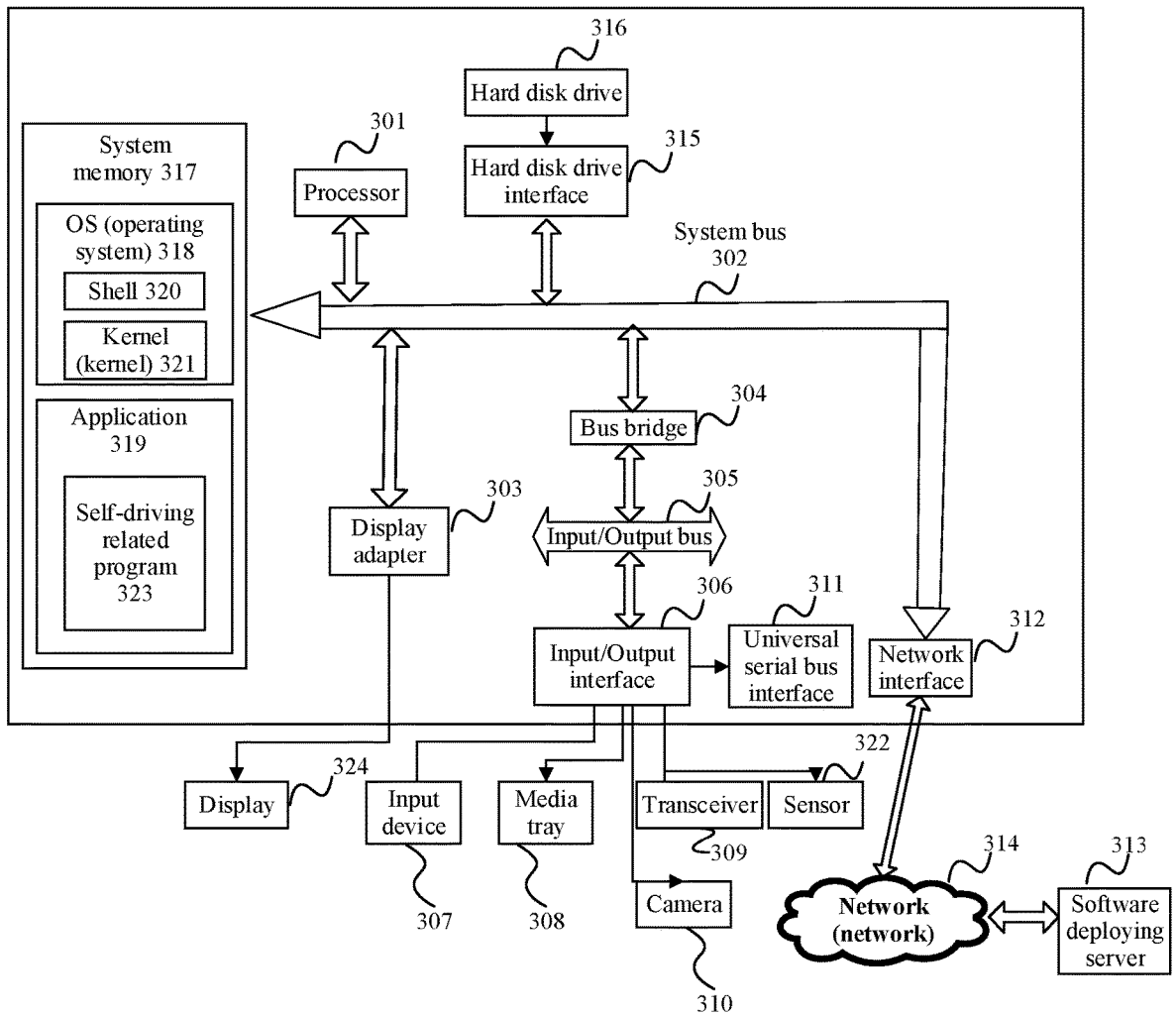
FIG. 3 is a schematic structural diagram of a computer system according to an embodiment of this application.

In a possible implementation of this embodiment of this application, as shown in FIG. 3, the computer system 160 shown in FIG. 1 includes a processor 301, and the processor 301 is coupled to a system bus 302. The processor 301 may be one or more processors, and each processor may include one or more processor cores. A display adapter (video adapter) 303 may drive a display 324, and the display 324 is coupled to the system bus 302. The system bus 302 is coupled to an input/output (I/O) bus 305 by using a bus bridge 304. An I/O interface 306 is coupled to the I/O bus 305. The I/O interface 306 communicates with a plurality of I/O devices, such as an input device 307 (such as a keyboard, a mouse, or a display screen), and a media tray 308 (such as a compact disc (CD) read-only memory (ROM) (CD-ROM) or a multimedia interface). A transceiver 309 (which may send and/or receive a radio communication signal), a camera 310 (which may capture static and dynamic digital video images), and an external Universal Serial Bus (USB) interface 311 exist. In some embodiments, an interface connected to the I/O interface 306 may be a USB interface.

The processor 301 may be any conventional processor, including a reduced instruction set computer (RISC) processor, a complex instruction set computer (CISC) processor, or a combination thereof. In some embodiments, the processor may be a dedicated apparatus such as an ASIC. In some embodiments, the processor 301 may be a neural network processor or a combination of a neural network processor and the foregoing conventional processor.

In some embodiments, in various embodiments described herein, the computer system 160 may be located away from the self-driving vehicle and may communicate wirelessly with the self-driving vehicle 100. In another aspect, some processes described herein may be set to be executed on a processor in the self-driving vehicle, and some other processes are executed by a remote processor, including taking necessary actions to perform a single operation.

The computer system 160 may communicate with a software deploying server 313 through a network interface 312. The network interface 312 is a hardware network interface, for example, a network adapter. A network 314 may be an external network, such as Internet, or may be an internal network, such as Ethernet or a virtual private network (VPN). In some embodiments, the network 314 may alternatively be a wireless network, such as a WI-FI network or a cellular network.

A hard disk drive interface 315 is coupled to the system bus 302. The hard disk drive interface 315 is connected to a hard disk drive 316. A system memory 317 is coupled to the system bus 302. Data running in the system memory 317 may include an operating system (OS) 318 and an application program 319 of the computer system 160.

The operating system includes but is not limited to a shell 320 and a kernel 321. The shell 320 is an interface between a user and the kernel of the operating system. The shell is an outermost layer of the operating system. The shell manages interaction between the user and the operating system: waiting for an input from the user, interpreting the input from the user to the operating system, and processing various output results of the operating system.

The kernel 321 includes parts of the operating system that are used to manage a memory, a file, a peripheral, and a system resource. When directly interacting with hardware, the kernel of the operating system usually runs a process, provides inter-process communication, and provides functions such as CPU time slice management, interrupt, memory management, and I/O management.

The application program 319 includes a program related to controlling self-driving of the vehicle, for example, a program for managing interaction between the self-driving vehicle and a road obstacle, a program for controlling a route or a speed of the self-driving vehicle, and a program for controlling interaction between the self-driving vehicle and another self-driving vehicle on the road. The application program 319 also exists in a system of the deploying server 313. In an embodiment, the computer system 160 may download the application program 319 from the deploying server 313 when the application program 319 needs to be executed.

For another example, the application program 319 may be an application program that controls the vehicle to calculate a final driving policy based on the foregoing environment information, status information, and a conventional rule-based driving policy. The environment information is information about a current environment (a green belt, a lane, a traffic signal light, and the like) in which the vehicle is located, and the status information is information (a speed, an acceleration speed, and the like) about a target object that interacts with the vehicle. The processor 301 of the computer system 160 invokes the application program 319 to obtain the final driving policy.

A sensor 322 is associated with the computer system 160. The sensor 322 is configured to detect a surrounding environment of the computer system 160. For example, the sensor 322 may detect an animal, a car, an obstacle, and a sidewalk. Further, the sensor may further detect a surrounding environment of the foregoing object such as an animal, a car, an obstacle, and a sidewalk. For example, a surrounding environment of an animal includes, for example, another animal that appears around the animal, a weather condition, and brightness of the surrounding environment. In some embodiments, if the computer system 160 is located in the self-driving vehicle, the sensor may be a camera, an infrared sensor, a chemical detector, a microphone, or the like.

Figure 4:
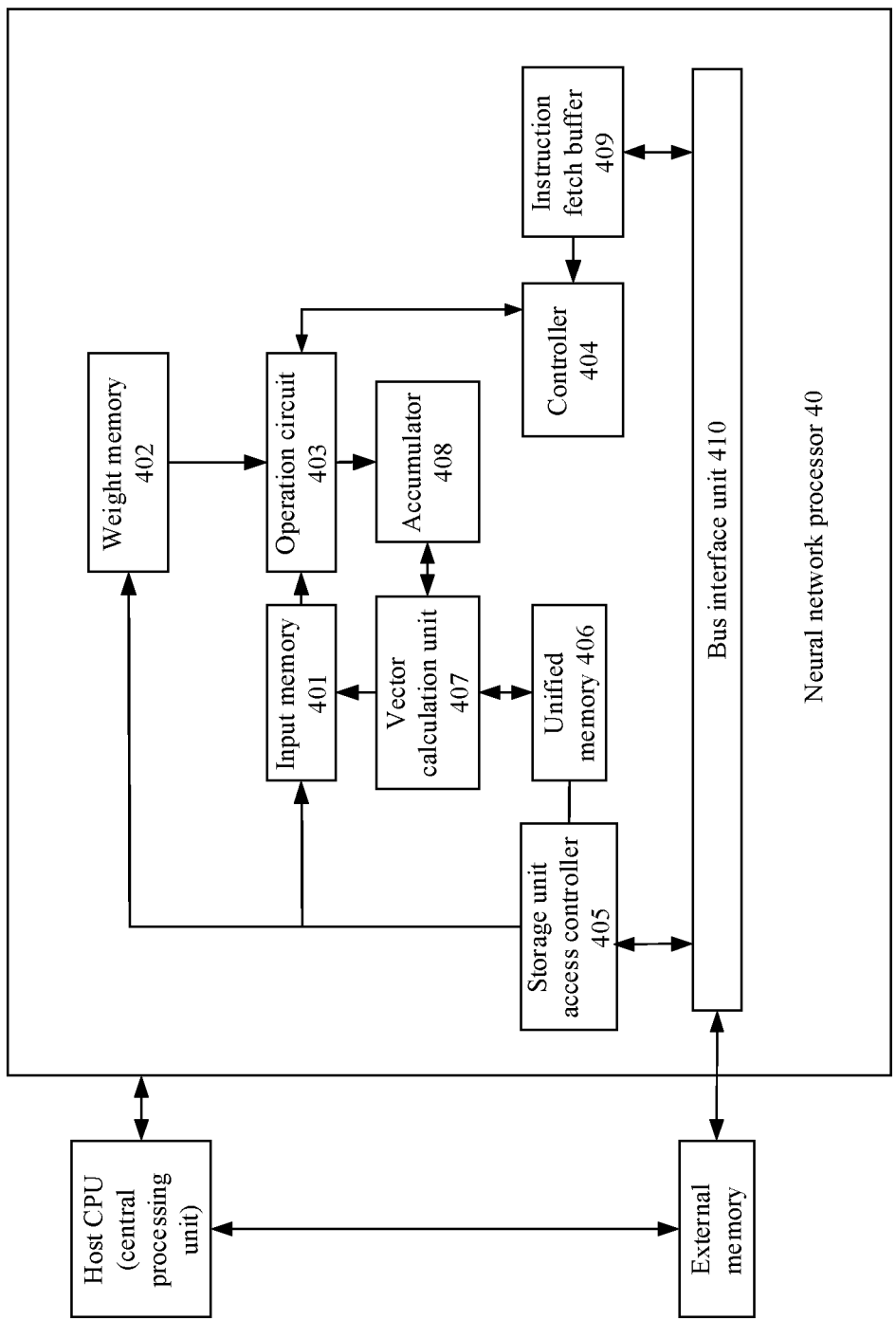
FIG. 4 is a schematic structural diagram of a chip system according to an embodiment of this application.

In some other embodiments of this application, the passenger protection method in the embodiment of this application may further be executed by a chip system. FIG. 4 is a structural diagram of a chip system according to an embodiment of this application.

A neural network processor (NPU) 40 is mounted on a host CPU as a coprocessor, and the host CPU allocates a task to the NPU. A core part of the NPU is an operation circuit 403. For example, the operation circuit 403 is controlled by using a controller 404, so that the operation circuit 403 can extract matrix data from a memory and perform a multiplication operation.

In some implementations, the operation circuit 403 internally includes a plurality of processing units (or process engines (Pes)). In some implementations, the operation circuit 403 is a two-dimensional systolic array. The operation circuit 403 may alternatively be a one-dimensional systolic array, or another electronic circuit that can perform a mathematical operation such as multiplication and addition. In some implementations, the operation circuit 403 is a general-purpose matrix processor.

For example, it is assumed that there is an input matrix A, a weight matrix B, and an output matrix C. The operation circuit 403 obtains data corresponding to the weight matrix B from a weight memory 402, and buffers the data on each PE in the operation circuit 403. The operation circuit 403 fetches data corresponding to the input matrix A from an input memory 401, and performs a matrix operation based on the input matrix A and the weight matrix B, to obtain a partial result or a final result of the matrix operation, which may be stored in an accumulator 408.

For another example, the operation circuit 403 may be configured to implement a feature extraction model (for example, a convolutional neural network (CNN) model), input image data into the convolutional neural network model, and obtain an image feature by performing an operation using the model. Further, the image feature is output to a classifier, and the classifier outputs a classification probability of an object in an image.

A unified memory 406 is configured to store input data and output data. Weight data in an external memory is directly sent to the weight memory 402 by using a storage unit access controller (direct memory access controller (DMAC)) 405. Input data in the external memory may be moved to the unified memory 406 or to the input memory 401 by using the DMAC.

A bus interface unit (BIU) 410 is used for interaction between an AXI bus and the DMAC and an instruction fetch buffer 409. The bus interface unit 410 is further used by the instruction fetch buffer 409 to obtain instructions from the external memory, and is further used by the storage unit access controller 405 to obtain original data of the input matrix A or the weight matrix B from the external memory.

The DMAC is mainly configured to move the input data in the external memory (double data rate (DDR)) to the unified memory 406, or move the weight data to the weight memory 402, or move the input data to the input memory 401.

A vector calculation unit 407 may include a plurality of operation processing units. The vector calculation unit 407 may be configured to further process an output of the operation circuit 403, such as vector multiplication, vector addition, exponential operation, logarithm operation, and size comparison, if required. The vector calculation unit 407 is mainly used for calculation at a non-convolutional/fully connected (FC) layer network in a neural network, such as pooling, batch normalization, and local response normalization.

In some implementations, the vector calculation unit 407 stores a processed output vector into the unified memory 406. For example, the vector calculation unit 407 may apply a non-linear function to the output of the operation circuit 403, for example, a vector of an accumulated value, to generate an activation value. In some implementations, the vector calculation unit 407 generates a normalized value, a combined value, or both. In some implementations, the processed output vector can also be used as an activation input to the operation circuit 403, for example, for use at a subsequent layer in the neural network.

The controller 404 is connected to the instruction fetch buffer 409, and instructions used by the controller 404 may be stored in the instruction fetch buffer 409.

In a possible implementation, the unified memory 406, the input memory 401, the weight memory 402, and the instruction fetch buffer 409 are all on-chip memories. The external memory is private to a hardware architecture of the NPU.

With reference to FIG. 1 to FIG. 3, the host CPU and the NPU may cooperate to implement a corresponding algorithm of a function required by the vehicle 100 in FIG. 1, or may implement a corresponding algorithm of a function required by the vehicle shown in FIG. 2, or may implement a corresponding algorithm of a function required by the computer system 160 shown in FIG. 3.

Figure 5:
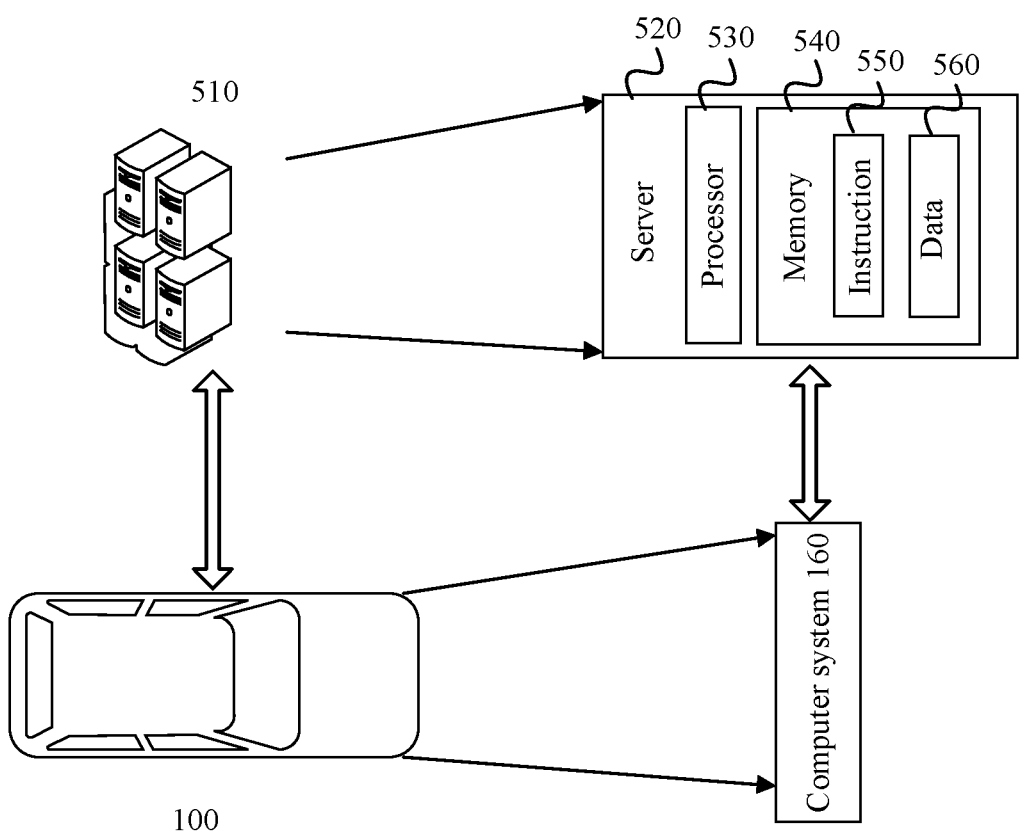
FIG. 5 is a schematic application diagram in which a self-driving vehicle is instructed from a cloud side according to an embodiment of this application.

In some other embodiments of this application, the computer system 160 may further receive information from or transfer information to another computer system. Alternatively, sensor data collected from the sensor system 120 of the vehicle 100 may be transferred to another computer, and the other computer processes the data. As shown in FIG. 5, data from the computer system 160 may be transmitted through a network to a cloud-side computer system 510 for further processing. The network and an intermediate node may include various configurations and protocols, including Internet, World Wide Web, an intranet, a virtual private network, a wide area network, a local area network, a dedicated network using a proprietary communication protocol of one or more companies, Ethernet, WI-FI, Hypertext Transfer Protocol (HTTP), and various combinations thereof. Such communication may be performed by any device capable of transmitting data to and from another computer, such as a modem and a wireless interface.

In one example, another computer system 510 (located on a server) may include a server having a plurality of computers, such as a load balancing server group. To receive, process, and transmit data from the computer system 160, the other computer system 510 exchanges information with different nodes of the network. The server 520 may have a configuration similar to that of the computer system 160, and has a processor 530, a memory 540, an instruction 550, and data 560.

In one example, the data 560 of the server 520 may include providing weather-related information. For example, the server 520 may receive, monitor, store, update, and transmit various pieces of weather-related information. The information may include, for example, rainfall, cloud, and/or temperature information and/or humidity information in a form of a report, radar information, a forecast, or the like.

Figure 6:
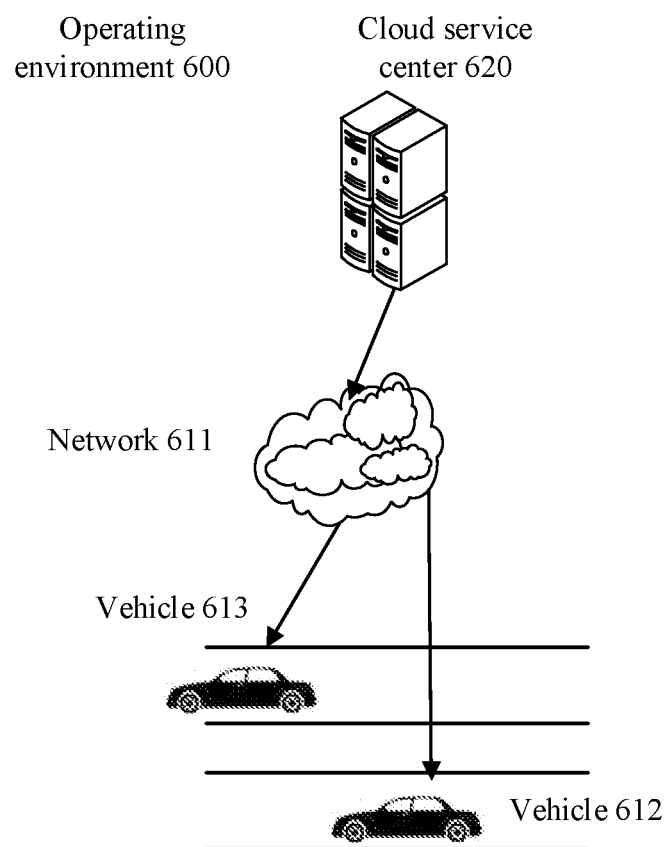
FIG. 6 is a schematic application diagram in which a self-driving vehicle is instructed from a cloud side according to an embodiment of this application.

FIG. 6 is an example of interaction between a self-driving vehicle and a cloud service center (or cloud server). The cloud service center may receive information (such as data collected by a vehicle sensor or other information) from self-driving vehicles 613 and 612 within an environment 600 of the cloud service center through a network 611 such as a wireless communication network.

The cloud service center 620 runs, based on the received data, data stored by the cloud service center 620 and monitored by the sensor to determine in-vehicle passenger information and in-vehicle environment information, so as to determine an abnormal state type and an abnormality degree and determine a related program of an emergency measure based on the abnormal state type and the abnormality degree, so as to remind related personnel of the self-driving vehicles 613 and 612 and/or take a corresponding emergency control measure.

For example, the cloud service center 620 may provide a part of a map to the vehicles 613 and 612 by using the network 611. In another example, operations may be divided between different locations. For example, a plurality of cloud service centers may receive, acknowledge, combine, and/or send information reports. In some examples, information reports and/or sensor data may also be sent between vehicles. Another configuration is also possible.

In some examples, the cloud service center 620 sends, to the self-driving vehicle, a response indicating to or not to remind a related person such as a driver of an in-vehicle abnormal condition. For example, the cloud service center 620 determines a communication object, communication content, a communication manner, and an emergency control measure of emergency communication based on collected sensor data and emergency measure information. The cloud service center 620 observes a change of a video stream or statuses of the vehicles 613 and 612 in an operating environment 600 of the cloud service center 620, for example, a change of a speed, a change of a status of an in-vehicle passenger, and a change of an in-vehicle environment, and confirms an effect of the emergency measure, so that before emergency control is performed next time, the emergency measure at the current time is evaluated based on the effect of the emergency measure, so as to control the vehicle to take a more accurate emergency measure.

Figure 7:
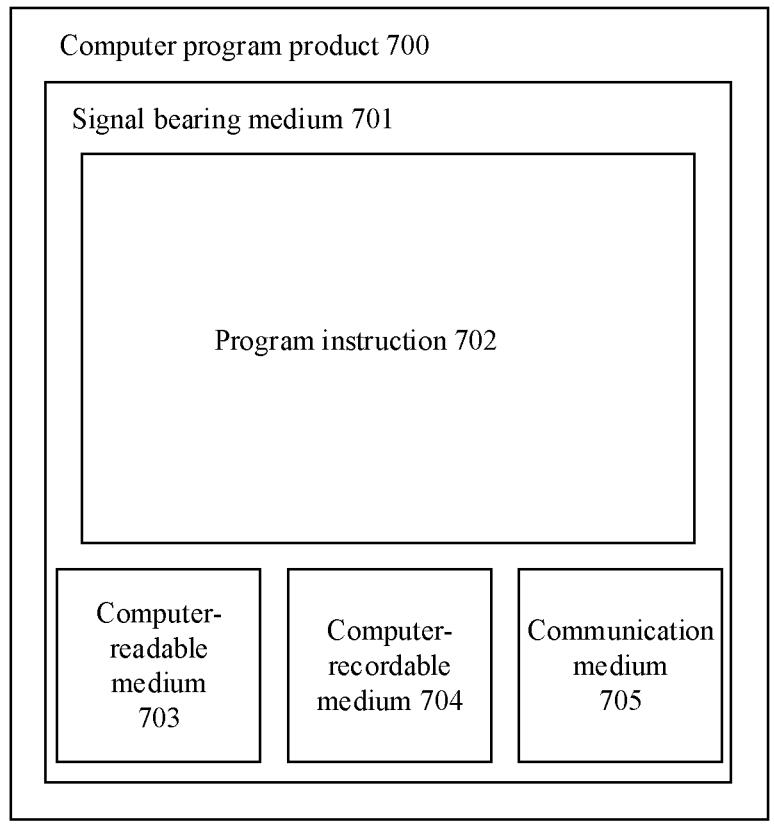
FIG. 7 is a schematic structural diagram of a computer program product according to an embodiment of this application.

In some embodiments, the disclosed method may be implemented as a computer program instruction encoded on a computer-readable storage medium or encoded on another non-transitory medium or article in a machine readable format. FIG. 7 schematically shows a conceptual partial view of an example computer program product arranged according to at least some embodiments shown herein, and the example computer program product includes a computer program for executing a computer process on a computing device. In an embodiment, an example computer program product 700 is provided by using a signal bearing medium 701. The signal bearing medium 701 may include one or more program instructions 702. When being run by one or more processors, the one or more program instructions 702 may provide all or some of the functions described above for FIG. 1 to FIG. 6, or may provide all or some of functions described in subsequent embodiments. For example, referring to an embodiment shown in FIG. 8, one or more features of S801 to S803 may be borne by one or more instructions associated with the signal bearing medium 701.

In addition, the program instruction 702 in FIG. 7 also describes an example instruction.

In some examples, the signal bearing medium 701 may include a computer-readable medium 703, such as but not limited to a hard disk drive, a CD, a DIGITAL VERSATILE DISC (DVD), a digital tape, a memory, a ROM, a random-access memory (RAM), and the like. In some implementations, the signal bearing medium 601 may include a computer-recordable medium 704, such as but not limited to a memory, a read/write (R/W) CD, an R/W DVD, and the like. In some implementations, the signal bearing medium 701 may include a communication medium 705, such as but not limited to, a digital and/or analog communication medium (for example, an optical fiber cable, a waveguide, a wired communication link, and a wireless communication link). Thus, for example, the signal bearing medium 701 may be communicated by using the communication medium 705 in a wireless manner (for example, a wireless communication medium complying with the Institute of Electrical and Electronics Engineers (IEEE) 802.11 standard or another transmission protocol). The one or more program instructions 702 may be, for example, a computer-executable instruction or a logical implementation instruction. In some examples, a computing device described for FIG. 1 to FIG. 6 may be configured to provide various operations, functions, or actions in response to the program instruction 702 that is communicated to the computing device by using one or more of the computer-readable medium 703, and/or the computer-recordable medium 704, and/or the communication medium 705. It should be understood that the arrangements described herein are merely intended for example purposes. Therefore, a person skilled in the art will understand that other arrangements and other elements (for example, machines, interfaces, functions, sequences, and function groups) can be used instead, and some elements may be omitted together based on a desired result. In addition, many of the elements described are functional entities that may be implemented as discrete or distributed components or that are implemented in combination with other components in any suitable combination and location.

Figure 8:
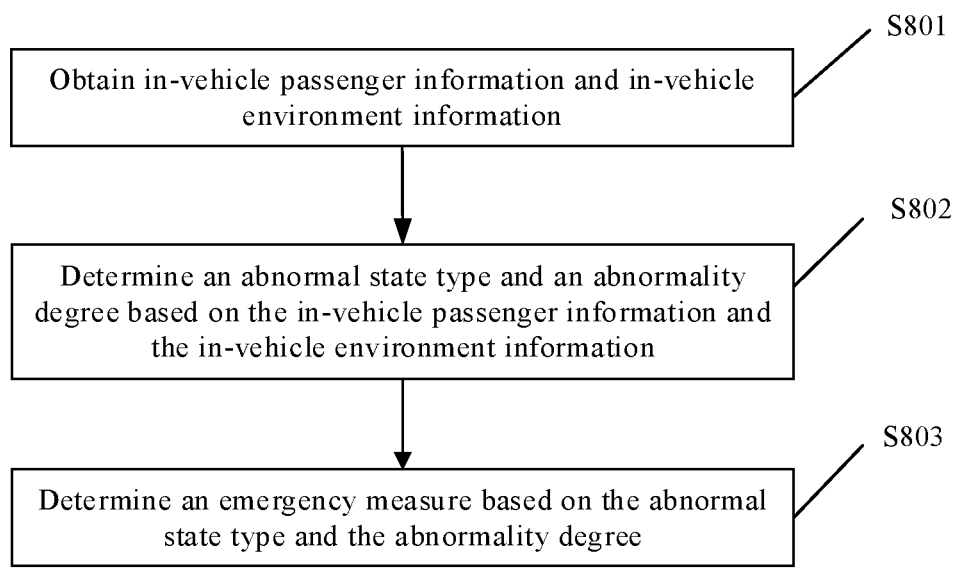
FIG. 8 is a schematic flowchart of a passenger protection method according to an embodiment of this application.

To identify an in-vehicle abnormal condition in time and reduce or avoid impact of the in-vehicle abnormal condition on a passenger to protect the in-vehicle passenger, especially in a scenario in which a driver leaves a vehicle, this application provides a passenger protection method, which may be performed by the processor 161, the processor 301, the NPU 40, and the processor 530 in the foregoing embodiment. As shown in FIG. 8, the method includes steps S801-S803.

S801: Obtain in-vehicle passenger information and in-vehicle environment information.

The in-vehicle passenger information includes at least one of in-vehicle passenger behavior information and in-vehicle passenger voice information. The in-vehicle passenger behavior information includes at least one of an in-vehicle passenger location, an in-vehicle passenger posture, and an in-vehicle passenger facial expression. The in-vehicle passenger voice information includes at least one of an in-vehicle passenger volume, an in-vehicle passenger voiceprint, and in-vehicle passenger voice semantic information. The in-vehicle environment information includes at least one of in-vehicle environment image information, in-vehicle environment sound information, in-vehicle air quality information, and in-vehicle temperature information.

For example, the in-vehicle passenger location includes a front seat and a back seat. Further, the front seat may be divided into a driver seat and a front passenger seat. The back seat may be divided into a back seat on a driver side and a back seat on a front passenger side. The in-vehicle passenger posture includes sitting up, curling up, lying, and the like. The in-vehicle passenger facial expression includes normal, happy, sad, angry, anxious, uncomfortable, or the like. The in-vehicle passenger voiceprint information includes a baby, a teenager, an adult, an old person, and the like. The in-vehicle passenger voice semantic information includes seeking help, singing, making a call, and the like. The in-vehicle environment image information includes normal, fire, a vehicle accident, and the like.

In some embodiments, a process of determining the in-vehicle passenger information and the in-vehicle environment information is a process of converting unstructured data collected from a sensor into structured data or semi-structured data. At least one of in-vehicle seat pressure data, in-vehicle passenger image data, and in-vehicle passenger voice data, that is, first data is obtained by using at least one of a seat pressure sensor, a camera, and a sound sensor. At least one of in-vehicle environment image data, in-vehicle environment sound data, in-vehicle air quality data, and in-vehicle temperature data, that is, second data is obtained by using at least one of the camera, the sound sensor, an air quality sensor, and a temperature sensor. Then, because the in-vehicle seat pressure data and the in-vehicle passenger image data can reflect the in-vehicle passenger location to some extent, the in-vehicle seat pressure data and the in-vehicle passenger image data in the first data are analyzed to determine the in-vehicle passenger location. The in-vehicle passenger image data is analyzed to determine the in-vehicle passenger posture and the in-vehicle passenger facial expression. The in-vehicle passenger voice data in the first data is analyzed to determine the in-vehicle passenger volume, the in-vehicle passenger voiceprint, and the in-vehicle passenger voice semantic information. In this way, the in-vehicle passenger information can be obtained.

For example, a seat pressure sensor A, a seat pressure sensor B, a seat pressure sensor C, and a seat pressure sensor D are respectively disposed in four seats in the vehicle, that is, the driver seat, the front passenger seat, the back seat on the driver side, and the back seat on the front passenger side. In the four seat pressure sensors, if seat pressure data collected by A and B exceeds a preset seat pressure threshold, and seat pressure data collected by C and D does not exceed the preset seat pressure threshold, the in-vehicle passenger image data collected by the camera is analyzed in combination to determine that there is a passenger on the driver seat, but a suitcase is disposed on the front passenger seat. In conclusion, it may be further determined that there is only one in-vehicle passenger, and a location of the in-vehicle passenger is the driver seat.

The in-vehicle environment image information includes normal, fire, a vehicle accident, and the like. In-vehicle fire is used as an example. When an image collected by the camera has a change, noise, heat, smoke, carbon dioxide, and the like may be generated due to combustion of a combustible substance, and the in-vehicle environment sound data, the in-vehicle temperature data, the in-vehicle air quality data, and the like collected by the sound sensor, the temperature sensor, and the air quality sensor in the vehicle may change. Therefore, in addition to separately analyzing the in-vehicle environment sound data, the in-vehicle air quality data, and the in-vehicle temperature data in the second data, to determine the in-vehicle environment sound information, the in-vehicle air quality information, and the in-vehicle temperature information, the in-vehicle environment image data, the in-vehicle environment sound data, the in-vehicle air quality data, and the in-vehicle temperature data further need to be comprehensively analyzed to determine the in-vehicle environment image information. In this way, the in-vehicle environment information can be obtained.

For example, if values of all of the in-vehicle environment sound data, the in-vehicle temperature data, and the in-vehicle air quality data do not increase, and the in-vehicle environment image data is normal, it is determined that the in-vehicle environment image information is normal. If one or more of the values of the in-vehicle environment sound data, the in-vehicle temperature data, and the in-vehicle air quality data values are increased, and the in-vehicle environment data is abnormal, it is determined that the in-vehicle environment image information is abnormal, for example, fire breaks out.

In some embodiments, after the first data and the second data are obtained, the first data and the second data may be analyzed based on a neural network model, to separately determine the in-vehicle passenger information and the in-vehicle environment information. The neural network model is obtained by performing model training by using historical data and a deep learning algorithm.

In some embodiments, if at least one of a vibration sensor and a touch sensor is further installed in the vehicle, at least one of the vibration sensor and the touch sensor may be further used to obtain at least one of in-vehicle seat vibration data and in-vehicle display screen touch data. Then, if the passenger acts in the vehicle, when the in-vehicle passenger image data collected by the camera changes, the in-vehicle seat pressure data also changes with the action of the passenger. Therefore, when motion information of the in-vehicle passenger is being determined, the in-vehicle passenger image data, the in-vehicle seat pressure data, and the in-vehicle seat vibration data need to be analyzed. In addition, when the in-vehicle passenger acts, the in-vehicle passenger location may change. Therefore, when the in-vehicle passenger location is being determined, the in-vehicle passenger image data, the in-vehicle seat pressure data, and the in-vehicle seat vibration data need to be analyzed. The in-vehicle passenger image data is analyzed to determine the in-vehicle passenger posture and the in-vehicle passenger facial expression. The in-vehicle passenger voice data in the first data is analyzed to determine the in-vehicle passenger volume, the in-vehicle passenger voiceprint, and the in-vehicle passenger voice semantic information. The in-vehicle display screen touch data in the first data is analyzed to determine in-vehicle passenger touch display screen information. In this way, the in-vehicle passenger information can be obtained.

For example, a seat pressure sensor A, a seat pressure sensor B, a seat pressure sensor C, and a seat pressure sensor D, and a seat vibration sensor E, a seat vibration sensor F, a seat vibration sensor G, and a seat vibration sensor H are respectively disposed in four seats in the vehicle, that is, the driver seat, the front passenger seat, the back seat on the driver side, and the back seat on the front passenger side. First, in the four seat pressure sensors, seat pressure sensors collected by A and B exceed the preset seat pressure threshold. Then, in the seat vibration sensors, seat vibration data received by E and F exceeds a preset vibration threshold. Finally, with reference to analysis of the in-vehicle passenger image data collected by the camera, it is determined that only the driver seat has a passenger. In conclusion, it may be further determined that there is only one in-vehicle passenger, the in-vehicle passenger moves from the front passenger seat to the driver seat, and a current location of the in-vehicle passenger is the driver seat.

In some embodiments, if at least one of a humidity sensor, a smoke sensor, and a vehicle speed sensor is further installed in the vehicle, at least one of the humidity sensor, the smoke sensor, and the vehicle speed sensor may be further used to obtain at least one of in-vehicle humidity data, in-vehicle smoke concentration data, and vehicle speed data. Then, the vehicle speed data is analyzed to determine vehicle speed information. If the in-vehicle environment image information includes normal, fire, a vehicle accident, and the like, taking in-vehicle fire as an example, when the image collected by the camera has a change, noise, heat, smoke, carbon dioxide, and the like may be generated due to combustion of a combustible substance, and the in-vehicle environment sound data, the in-vehicle temperature data, the in-vehicle smoke concentration data, the in-vehicle air quality data, the in-vehicle humidity data, and the like collected by the sound sensor, the temperature sensor, the smoke sensor, the air quality sensor, and the humidity sensor in the vehicle may change. Therefore, in addition to separately analyzing the in-vehicle environment sound data, the in-vehicle air quality data, the in-vehicle temperature data, the in-vehicle smoke concentration data, and the in-vehicle humidity data in the second data, to determine the in-vehicle environment sound information, the in-vehicle air quality information, the in-vehicle temperature information, the in-vehicle smoke information, and the in-vehicle humidity information, the in-vehicle environment image data, the in-vehicle environment sound data, the in-vehicle air quality data, the in-vehicle temperature data, the in-vehicle environment sound data, the in-vehicle smoke concentration data, and the in-vehicle humidity data need to be comprehensively analyzed to determine the in-vehicle environment image information. In this way, the in-vehicle environment information can be obtained.

For example, if values of the in-vehicle environment sound data, the in-vehicle temperature data, the in-vehicle air quality data, the in-vehicle smoke concentration data, and the in-vehicle humidity data do not increase, and with reference to analysis of the in-vehicle environment image data, if the in-vehicle environment image data is normal, the in-vehicle environment image information is normal. If values of the in-vehicle environment sound data, the in-vehicle temperature data, the in-vehicle air quality data, the in-vehicle smoke concentration data, and the in-vehicle humidity data are increased, in combination with analysis of the in-vehicle environment image data, if the in-vehicle environment image data is abnormal, it is determined that the in-vehicle environment image information is fire.

For example, after the first data is analyzed, it is determined that there is only one in-vehicle passenger, and the passenger is located on the back seat on the front passenger side. In this case, if the vehicle speed data exceeds a preset speed threshold, and the in-vehicle environment image information is normal, it is determined that the vehicle encounters a vehicle sliding condition.

It should be noted that in an in-vehicle passenger sensing process and an in-vehicle environment sensing process, the in-vehicle camera and sound sensor are involved, so that the in-vehicle sensors are reused, and in-vehicle sensor information can be more fully used. In addition, when the first data and the second data that are monitored by the sensors are analyzed to determine the in-vehicle passenger information and the in-vehicle environment information, if a larger quantity of sensors and more types of sensors are involved, more abundant first data and second data are obtained, and the in-vehicle passenger information and the in-vehicle environment information are more accurately determined.

In another possible implementation, before the in-vehicle passenger information and the in-vehicle environment information are determined, a passenger protection mode is enabled.

In some embodiments, the passenger protection mode may be automatically enabled by using a wake-up signal after the driver leaves the vehicle or after a vehicle driving system is disabled. The wake-up signal is one or more pieces of sensor data that may reflect presence of an in-vehicle passenger.

For example, if the in-vehicle seat pressure data exceeds the preset pressure threshold and lasts for more than preset duration, the in-vehicle seat pressure data may be used as a wake-up signal to trigger the passenger protection mode. Alternatively, if the in-vehicle passenger volume in the in-vehicle passenger voice data exceeds a preset decibel threshold, the in-vehicle passenger voice data may be used as a wake-up signal to trigger the passenger protection mode. Alternatively, if the in-vehicle seat vibration data exceeds the preset vibration threshold, the in-vehicle seat vibration data may be used as a wake-up signal to trigger the passenger protection mode. In addition to the foregoing in-vehicle seat pressure data and in-vehicle passenger voice data, after the in-vehicle display screen touch data and another vehicle driving system sleep or shut down, they can receive external information and automatically power on, to start a sensor or an apparatus in the vehicle driving system to obtain data, or the like, and the data may also be used as a wake-up signal to wake up the passenger protection mode.

In some embodiments, the passenger protection mode may alternatively be manually triggered by the driver, that is, when the driver leaves the vehicle or after the driver leaves the vehicle, the driver manually triggers the passenger protection mode in an interaction manner between the driver and the vehicle. For example, the driver may control, by operating an application (APP) installed on a mobile phone or another electronic device terminal of the driver or by operating a central control unit screen of the vehicle, the passenger protection mode to be enabled.

It should be noted that the passenger protection mode is triggered in a plurality of manners, which provides a user with a good foolproof design for triggering the passenger protection mode, and can ensure that the passenger protection mode is enabled in a necessary case. In addition, in the passenger protection mode, the in-vehicle passenger can be protected more systematically. Therefore, by using the foregoing process, safety of the in-vehicle passenger can be better ensured, and unnecessary casualties can be reduced.

In some embodiments, after the passenger protection mode is enabled, the first data and the second data are processed at a preset low frequency to separately determine the in-vehicle passenger information and the in-vehicle environment information, and/or in the passenger protection mode, at least one of other functions in the vehicle that are not related to the passenger protection mode is disabled, such as a driving function, an entertainment function, and a navigation function, and/or in the passenger protection mode, a calculation unit in the vehicle that is not related to the passenger protection mode is disabled, for example, a driving policy calculation unit.

In the foregoing process, after the passenger protection mode is enabled, the system may work at a relatively low frequency, and/or control a function module that is not related to the passenger protection mode to be disabled, thereby reducing system power consumption.

It should be noted that, in the passenger protection mode, a function module or a calculation unit that is not related to the mode remains disabled, but the vehicle driving system has a control permission on these function modules or calculation units. That is, in the passenger protection mode, the vehicle driving system may wake up or enable, based on a requirement of the vehicle driving system, a function module or a calculation unit that is originally kept disabled, to invoke some functions or complete a calculation task. In addition, the driver may perform a cloud upgrade on a component, in the vehicle driving system, that is related to the passenger protection mode, or may disable the passenger protection mode.

S802: Determine an abnormal state type and an abnormality degree based on the in-vehicle passenger information and the in-vehicle environment information.

The abnormal state type includes an in-vehicle passenger abnormality and/or an in-vehicle environment abnormality. The in-vehicle passenger abnormality includes at least one of an in-vehicle passenger behavior abnormality and an in-vehicle passenger voice abnormality, and the in-vehicle environment abnormality includes at least one of an in-vehicle environment image abnormality, an in-vehicle environment sound abnormality, an in-vehicle air quality abnormality, and an in-vehicle temperature abnormality.

In some embodiments, for the in-vehicle passenger information and the in-vehicle environment information that are obtained in step S801, the abnormal state type of the in-vehicle abnormality is determined with reference to a preset threshold and a pre-trained evaluation model. The pre-trained evaluation model may be a neural network model, and the neural network model may be determined by performing model training based on historical in-vehicle passenger information, historical in-vehicle environment information, and a depth learning algorithm.

For example, if the in-vehicle passenger posture is curling up or lying, and the in-vehicle passenger facial expression is uncomfortable, an in-vehicle passenger behavior abnormality exists, if the in-vehicle passenger facial expression is uncomfortable, it is determined that the abnormal state type is an in-vehicle passenger behavior abnormality, if the in-vehicle passenger volume exceeds a first preset decibel threshold corresponding to the in-vehicle passenger voiceprint, the abnormal state type is an in-vehicle passenger voice abnormality, if the in-vehicle passenger voice semantic information is seeking help, the abnormal state type is an in-vehicle passenger voice abnormality, if the in-vehicle passenger volume exceeds a first preset decibel threshold corresponding to the in-vehicle passenger voiceprint, and the in-vehicle passenger voice semantic information is seeking help, the abnormal state type is an in-vehicle passenger voice abnormality, if the in-vehicle environment image information is fire or a vehicle accident, the abnormal state type is an in-vehicle environment image abnormality, or if the in-vehicle environment sound information exceeds a second preset decibel threshold, an in-vehicle environment abnormality exists, and the abnormal state type is an in-vehicle environment sound abnormality. If in-vehicle air quality exceeds a preset air quality threshold, an in-vehicle environment abnormality exists, and the abnormal state type is an in-vehicle air quality abnormality. If an in-vehicle temperature exceeds a preset temperature threshold, an in-vehicle environment abnormality exists, and the abnormal state type is an in-vehicle temperature abnormality.

In some embodiments, after the abnormal state type is determined, the in-vehicle passenger information and the in-vehicle environment information in a same time period are fused to obtain fusion information used to describe a current in-vehicle scenario. The fusion information may be simple listing of the in-vehicle passenger information and the in-vehicle environment information, or may be an overall description of the current in-vehicle scenario. Then, the obtained fusion information is analyzed, and an abnormality degree of a current in-vehicle condition is obtained based on a magnitude of impact of the current in-vehicle scenario described by the fusion information on the passenger. In some embodiments, if the current in-vehicle scenario described by the fusion information does not affect safety of the in-vehicle passenger, or if the in-vehicle passenger is abnormal but the in-vehicle environment is not abnormal, the abnormality degree is low. If the impact of the in-vehicle scenario described by the fusion information on the in-vehicle passenger can be solved by taking an emergency measure, that is, a risk is controllable, the abnormality degree is relatively high. If the impact of the current in-vehicle scenario described by the fusion information on the in-vehicle passenger can only be alleviated by taking an emergency measure, and the safety of the in-vehicle passenger is still affected, the abnormality degree is high.

In some embodiments, if the fusion information is text information, an analysis method used to analyze the fusion information may be semantic analysis.

For example, the in-vehicle passenger information and the in-vehicle environment information are fused to obtain the fusion information. If the current in-vehicle scenario described by the fusion information is "a baby is crying", it may be determined that there is no abnormality in the current in-vehicle scenario except that a baby is crying, it may be considered that the current in-vehicle scenario does not affect safety of the in-vehicle baby, and the abnormality degree is low. If the current in-vehicle scenario described by the fusion information is "a baby is crying, and the in-vehicle temperature is abnormal", it may be determined that in the current in-vehicle scenario, the temperature abnormality affects the safety of the in-vehicle baby. However, the temperature abnormality may be adjusted by using an in-vehicle temperature regulation device, so that impact of the temperature abnormality on the in-vehicle baby is relieved. In this case, the abnormality degree is relatively high. If the current in-vehicle scenario described by the fusion information is "a baby is crying and fire breaks out in the vehicle", in the current in-vehicle scenario, the in-vehicle fire affects the baby greatly, the condition can only be alleviated by using an in-vehicle fire extinguishing apparatus, and the abnormality degree is high.

S803: Determine an emergency measure based on the abnormal state type and the abnormality degree.

The emergency measure is an action for reducing the abnormality degree, and includes emergency communication and/or an emergency control measure. Communication content of the emergency communication includes one or more pieces of vehicle location information, vehicle appearance information, license plate number information, in-vehicle status information, in-vehicle image data, in-vehicle sound information, status information of a sensor with abnormal data, the emergency control measure, other information that helps a communication object to evaluate an in-vehicle abnormal state, other information that helps the communication object to quickly locate the vehicle location, and other information that can improve rescue efficiency. A communication manner of the emergency communication is one or more of an SMS message, a multimedia message, a voice call, a manner of using a communication link between a vehicle driving system and the driver's handheld terminal, a manner of sending alarm information to a cloud server by using a network, and another manner in which the communication content can be sent and the communication link between the vehicle driving system and the driver can be established.

Based on different abnormality degrees, it is determined that the emergency measure includes emergency communication and/or an emergency control measure. In some embodiments, if the abnormality degree is low, it is determined that the emergency measure is emergency communication, and a contact of the emergency communication is a first preset emergency contact, for example, the driver. If the abnormality degree is relatively high, it is determined that the emergency measure is emergency communication and an emergency control measure, a contact of the emergency communication is a first preset emergency contact, and the emergency control measure is determined based on the abnormal state type. If the abnormality degree is high, it is determined that the emergency measure is emergency communication and an emergency control measure, contacts of the emergency communication are a first preset emergency contact and a second preset emergency contact, and the emergency control measure is determined based on the abnormal state type. The second preset emergency contact is a person or an organization, such as the driver or an emergency center, that can rescue the in-vehicle passenger. The first preset emergency contact and/or the second preset emergency contact of the emergency communication may be preset by the system, or may be set by the user based on a requirement of the user. The emergency control measure includes a measure of reminding the in-vehicle passenger and another person, a measure of adjusting a temperature, a ventilation measure, a fire extinguishing measure, and the like. For example, the emergency control measure includes one or more of reminding an in-vehicle passenger by using voice, opening a window, opening a door, opening an air purification device, opening a temperature regulation device, opening a fire extinguishing apparatus, unlocking/opening a door, sounding the horn, flashing a vehicle lamp, braking, opening/closing a sunroof, and another measure that the vehicle driving system can take by obtaining a vehicle control permission.

For example, if the abnormal state type is an in-vehicle temperature abnormality, the emergency control measure is at least one of opening a window, opening a door, and opening a temperature regulation device. If the abnormal state type is an in-vehicle air quality abnormality, the emergency control measure is at least one of opening a window, opening a door, and opening an air purification device. If the abnormal state type is an in-vehicle passenger behavior abnormality and/or an in-vehicle passenger voice abnormality, the emergency control measure is at least one of reminding an in-vehicle passenger by using voice, opening a window, opening a door, opening a temperature regulation device, opening a fire extinguishing apparatus, unlocking/opening a door, sounding the horn, and flashing a vehicle lamp. If the abnormal state type is an in-vehicle environment image abnormality and/or an in-vehicle environment sound abnormality, the emergency control measure is at least one of reminding an in-vehicle passenger by using voice, opening a window, opening a door, opening a temperature regulation device, opening a fire extinguishing apparatus, unlocking/opening a door, sounding the horn, and flashing a vehicle lamp.

For example, if an abnormal state that requires or needs to be reminded to a traffic participant outside the vehicle occurs in the vehicle, the emergency control measure includes at least one of sounding the horn and flashing a vehicle lamp. If the vehicle moves abnormally, for example, sliding or another abnormal state for which braking needs to be performed, the emergency control measure includes at least braking. If an in-vehicle abnormal state can be intervened and solved by the in-vehicle passenger, or another abnormal state that needs to be reminded to the in-vehicle passenger, the emergency control measure includes at least reminding the in-vehicle passenger by using voice.

For example, if the vehicle is a fully self-driving vehicle, and an abnormality degree of an in-vehicle condition is high, the emergency control measure may further be driving the vehicle to a nearest hospital, and the like.

It should be noted that an information flow of the emergency communication may be transmitted unidirectionally, that is, the communication content of the emergency communication is transmitted from the vehicle driving system to a communication object. In some embodiments, an information flow of the emergency communication may alternatively be transmitted in a plurality of directions, that is, the communication content of the emergency communication is transmitted from the vehicle driving system to a plurality of communication objects. In some embodiments, an information flow of the emergency communication may alternatively be transmitted bidirectionally, that is, the vehicle driving system may transmit information to a communication object, and may also receive information transmitted by the communication object.

In some embodiments, after the abnormal state type and the abnormality degree in the vehicle are determined, the in-vehicle passenger is first reminded by using voice, so that the in-vehicle passenger takes an emergency control measure in time to alleviate the in-vehicle abnormal condition. If the in-vehicle abnormal condition is not alleviated, the driver may be notified through emergency communication. The driver determines, based on the abnormal state type and the abnormality degree in the vehicle, whether an emergency control measure needs to be taken, what emergency measure is to be taken, and whether to further notify a person or an organization that can provide an emergency measure for the in-vehicle passenger.

In some embodiments, in another possible implementation, after the abnormal state type and the abnormality degree in the vehicle are determined, the driver or another related person may alternatively be directly notified through emergency communication, and the driver or the other related person determines, based on the abnormal state type and the abnormality degree in the vehicle, whether an emergency control measure needs to be taken, what emergency measure is to be taken, and whether to further notify a person or an organization that can provide an emergency measure for the in-vehicle passenger. The content of the emergency communication may further include an emergency control measure recommended to the user in addition to vehicle information, the in-vehicle passenger information, and the in-vehicle environment information. For a description of the emergency communication and the emergency control measure, refer to the foregoing content. Details are not described herein again.

According to the foregoing process, this embodiment of this application provides the passenger protection method based on the vehicle driving system. In-vehicle sensor information may be used to perform in-vehicle passenger sensing and in-vehicle environment sensing to a maximum extent, and the in-vehicle sensor information is processed and used by abundant calculation units in the system, to obtain the in-vehicle passenger information and the in-vehicle environment information, and determine the abnormal state type and the abnormality degree in the vehicle, so as to identify an in-vehicle abnormal condition in time. In addition, in this embodiment of this application, modules and vehicle-mounted devices in the vehicle may further be controlled, and a corresponding emergency measure is taken for the abnormal state type and the abnormality degree in the vehicle, to reduce or avoid impact of the in-vehicle abnormal condition on the passenger, and protect the in-vehicle passenger.

Figure 9:
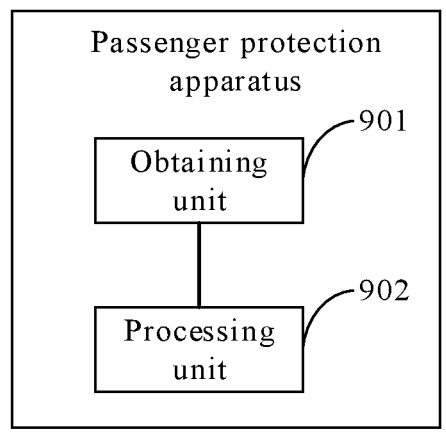
FIG. 9 is a schematic structural diagram of a passenger protection apparatus according to an embodiment of this application.

In an embodiment of this application, function module division may be performed on a passenger protection apparatus according to the foregoing method example. When function modules are obtained through division by using corresponding functions, FIG. 9 is a schematic diagram of a possible structure of a window automatic cleaning apparatus in the foregoing embodiment. As shown in FIG. 9, the passenger protection apparatus includes an obtaining unit 901 and a processing unit 902. Certainly, the passenger protection apparatus may further include another module, or the passenger protection apparatus may include fewer modules.

The obtaining unit 901 is configured to obtain in-vehicle passenger information and in-vehicle environment information. The in-vehicle passenger information includes one or more pieces of in-vehicle passenger behavior information and in-vehicle passenger voice information, and the in-vehicle environment information includes one or more pieces of in-vehicle environment image information, in-vehicle environment sound information, in-vehicle air quality information, and in-vehicle temperature information.

In some embodiments, the obtaining unit 901 is configured to obtain first data and second data that are monitored by a sensor, where the sensor includes one or more of a seat pressure sensor, a camera, a sound sensor, an air quality sensor, and a temperature sensor, determine the in-vehicle passenger information based on the first data, where the first data includes at least one of in-vehicle seat pressure data, in-vehicle passenger image data, and in-vehicle passenger voice data, and determine the in-vehicle environment information based on the second data, where the second data includes at least one of in-vehicle environment image data, in-vehicle environment sound data, in-vehicle air quality data, and in-vehicle temperature data.

In some embodiments, the processing unit 902 may be further configured to trigger a passenger protection mode by using a wake-up signal. The wake-up signal includes at least one of in-vehicle seat pressure data that exceeds a preset pressure threshold and that lasts for more than preset duration, and in-vehicle passenger voice data that exceeds a preset decibel threshold.

The processing unit 902 is configured to determine an abnormal state type and an abnormality degree based on the in-vehicle passenger information and the in-vehicle environment information. The abnormal state type includes an in-vehicle passenger abnormality and/or an in-vehicle environment abnormality, the in-vehicle passenger abnormality includes one or more of an in-vehicle passenger behavior abnormality and an in-vehicle passenger voice abnormality, and the in-vehicle environment abnormality includes one or more of an in-vehicle environment image abnormality, an in-vehicle environment sound abnormality, an in-vehicle air quality abnormality, and an in-vehicle temperature abnormality.

For example, the in-vehicle passenger behavior information includes an in-vehicle passenger location, an in-vehicle passenger posture, and an in-vehicle passenger facial expression. The in-vehicle passenger location includes a front seat and a back seat. The in-vehicle passenger posture includes sitting up, curling up, and lying. The in-vehicle passenger facial expression includes normal, happy, sad, angry, anxious, or uncomfortable. The in-vehicle passenger voice information includes an in-vehicle passenger volume, an in-vehicle passenger voiceprint, and in-vehicle passenger voice semantic information. The in-vehicle passenger voice semantic information includes seeking help, singing, and making a call. The in-vehicle environment image information includes normal, fire, a vehicle accident, and the like.

For example, if the in-vehicle passenger posture is curling up or lying, and the in-vehicle passenger facial expression is uncomfortable, it is determined that the abnormal state type is an in-vehicle passenger behavior abnormality. If the in-vehicle passenger volume exceeds a first preset decibel threshold corresponding to the in-vehicle passenger voiceprint and/or the in-vehicle passenger voice semantic information includes seeking help information, it is determined that the abnormal state type is an in-vehicle passenger voice abnormality. If the in-vehicle environment image information is fire or a vehicle accident, it is determined that the abnormal state type is an in-vehicle environment image abnormality. If the in-vehicle environment sound information exceeds a second preset decibel threshold, it is determined that the abnormal state type is an in-vehicle environment sound abnormality. If in-vehicle air quality exceeds a preset air quality threshold, it is determined that the abnormal state type is an in-vehicle air quality abnormality. If an in-vehicle temperature exceeds a preset temperature threshold, it is determined that the abnormal state type is an in-vehicle temperature abnormality.

In some embodiments, the processing unit 902 is configured to fuse the in-vehicle passenger information and the in-vehicle environment information in a same time period to obtain fusion information used to describe a current in-vehicle scenario, and analyze the fusion information to determine the abnormality degree used to indicate impact of the current in-vehicle scenario on a passenger.

For example, if the current in-vehicle scenario described by the fusion information is that a baby is crying, the abnormality degree is low. If the current in-vehicle scenario described by the fusion information is that a baby is crying and the in-vehicle temperature is abnormal, the abnormality degree is relatively high. If the current in-vehicle scenario described by the fusion information is that a baby is crying and fire breaks out in the vehicle, the abnormality degree is high.

The processing unit 902 is further configured to determine an emergency measure based on the abnormal state type and the abnormality degree, where the emergency measure is an operation for reducing the abnormality degree.

For example, the emergency measure includes emergency communication and/or an emergency control measure. Communication content of the emergency communication includes one or more pieces of vehicle location information, vehicle appearance information, license plate number information, in-vehicle status information, in-vehicle image data, in-vehicle sound information, status information of a sensor with abnormal data, and the emergency control measure. A communication manner of the emergency communication is one or more of an SMS message, a multimedia message, and a voice call. The emergency control measure includes one or more of reminding an in-vehicle passenger by using voice, opening a window, opening a door, opening an in-vehicle air purification device, opening a temperature regulation device, opening a fire extinguishing apparatus, unlocking/opening a door, sounding the horn, and flashing a vehicle lamp.

In some embodiments, the processing unit 902 is configured to, if the abnormality degree is low, determine that the emergency measure is emergency communication, where a contact of the emergency communication is a first preset emergency contact, if the abnormality degree is relatively high, determine that the emergency measure is emergency communication and an emergency control measure, where a contact of the emergency communication is a first preset emergency contact, and the emergency control measure is determined based on the abnormal state type, or if the abnormality degree is high, the emergency measure is emergency communication and an emergency control measure, where contacts of the emergency communication include a first preset emergency contact and a second preset emergency contact, and the emergency control measure is determined based on the abnormal state type.

For example, if the abnormal state type is an in-vehicle air quality abnormality, the emergency control measure is at least one of opening a window, opening a door, and opening an in-vehicle air purification device. If the abnormal state type is an in-vehicle temperature abnormality, the emergency control measure is at least one of opening a window, opening a door, and opening a temperature regulation device. If the abnormal state type is an in-vehicle passenger behavior abnormality and/or an in-vehicle passenger voice abnormality, the emergency control measure is at least one of reminding an in-vehicle passenger by using voice, opening a window, opening a door, opening a temperature regulation device, opening a fire extinguishing apparatus, unlocking/opening a door, sounding the horn, and flashing a vehicle lamp. If the abnormal state type is an in-vehicle environment image abnormality and/or an in-vehicle environment sound abnormality, the emergency control measure is at least one of reminding an in-vehicle passenger by using voice, opening a window, opening a door, opening a temperature regulation device, opening a fire extinguishing apparatus, unlocking/opening a door, sounding the horn, and flashing a vehicle lamp.

Figure 10:
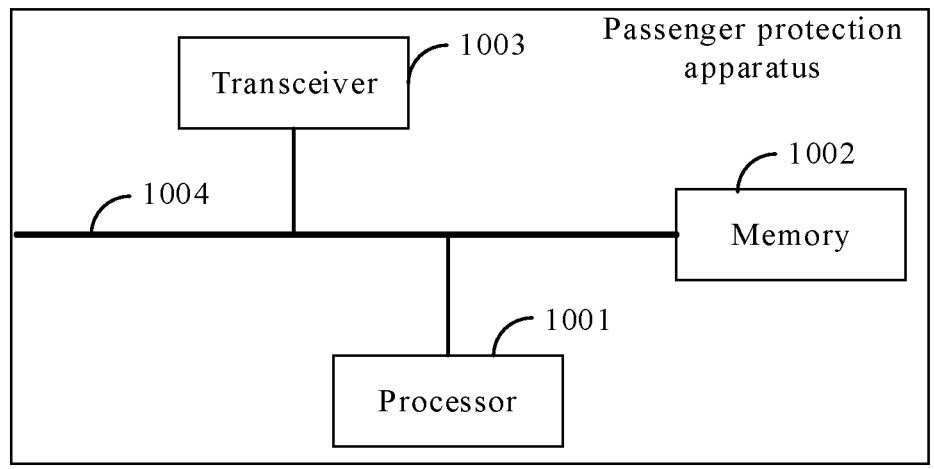
FIG. 10 is a schematic structural diagram of a passenger protection apparatus according to an embodiment of this application.

Referring to FIG. 10, this application further provides a passenger protection apparatus, including a processor 1001 and a memory 1002.

The processor 1001 and the memory 1002 are connected to each other (for example, are connected to each other by using a bus 1004).

In some embodiments, the passenger protection apparatus may further include a transceiver 1003, where the transceiver 1003 is connected to the processor 1001 and the memory 1002, and the transceiver 1003 is configured to receive/send data.

The processor 1001 may execute the implementation solution corresponding to FIG. 8 and operations of various feasible implementations thereof. For example, the processor 1001 is configured to perform operations of the obtaining unit 901 and the processing unit 902, and/or other operations described in the embodiments of this application.

For descriptions of the processor, the memory, the bus, and the transceiver, refer to the foregoing description. Details are not described herein again.

This application further provides a passenger protection apparatus, including a non-volatile storage medium and a central processing unit, where the non-volatile storage medium stores an executable program, and the central processing unit is connected to the non-volatile storage medium, and executes the executable program to implement the passenger protection method shown in FIG. 8 in the embodiment of this application.

Another embodiment of this application further provides a computer-readable storage medium. The computer-readable storage medium includes one or more pieces of program code. The one or more pieces of programs include an instruction. When a processor executes the program code, the automatic window cleaning apparatus performs the passenger protection method shown in FIG. 8.

In another embodiment of this application, a computer program product is further provided, where the computer program product includes computer-executable instructions, and the computer-executable instructions are stored in a computer-readable storage medium. At least one processor of a passenger protection apparatus may read the computer-executable instructions from the computer-readable storage medium. The at least one processor executes the computer-executable instructions, to enable the passenger protection apparatus to perform corresponding steps in the passenger protection method shown in FIG. 8.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by using software, hardware, firmware, or any combination thereof. When implemented by using a software program, the foregoing embodiments may appear in a form of a computer program product as a whole or in part, where the computer program product includes one or more computer instructions. When the computer program instructions are loaded and executed on a computer, the procedures or functions according to the embodiments of this application are all or partially generated.

The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions about implementations allow a person skilled in the art to clearly understand that, for the purpose of convenient and brief description, division into the foregoing functional units is used as an example for illustration. In actual application, the foregoing functions may be allocated to different functional units and implemented based on a requirement, that is, an inner structure of an apparatus is divided into different functional units to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. In an application process, some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the conventional technology, some of the technical solutions may be implemented in the form of a software product. The computer software product is stored in a storage medium and includes several instructions for instructing a device (which may be a personal computer, a server, a network device, a single-chip microcomputer, or a chip) or a processor to perform all or some of the steps of the methods described in the embodiments of this application. The foregoing storage medium includes any medium that can store program code, for example, a USB flash drive, a removable hard disk, a ROM, a RAM, a magnetic disk, or an optical disc.

The foregoing descriptions are merely implementations of this application, but are not intended to limit the protection scope of this application. Any variation or replacement within the technical scope disclosed in this application shall fall within the protection scope of this application.

The invention claimed is:

1. A passenger protection method comprising:
automatically triggering, based on driver information, a passenger protection mode in response to a wake-up signal, wherein the wake-up signal comprises first in-vehicle seat pressure data of an in-vehicle passenger exceeding a preset pressure threshold and that continues for more than a preset duration;
obtaining in-vehicle passenger information and in-vehicle environment information after triggering the passenger protection mode, wherein the in-vehicle passenger information comprises one or more of in-vehicle passenger behavior information or in-vehicle passenger voice information, and wherein the in-vehicle environment information comprises one or more of in-vehicle environment image information, in-vehicle environment sound information, in-vehicle air quality information, or in-vehicle temperature information;

obtaining, based on the in-vehicle passenger information and the in-vehicle environment information, an abnormal state type and an abnormality degree, wherein the abnormal state type comprises an in-vehicle passenger abnormality or an in-vehicle environment abnormality, wherein the in-vehicle passenger abnormality comprises one or more of an in-vehicle passenger behavior abnormality or an in-vehicle passenger voice abnormality, and wherein the in-vehicle environment abnormality comprises one or more of an in-vehicle environment image abnormality, an in-vehicle environment sound abnormality, an in-vehicle air quality abnormality, or an in-vehicle temperature abnormality; and controlling at least one of a driving function or an entertainment function based on an emergency measure for reducing the abnormality degree, wherein the emergency measure is based on the abnormal state type and the abnormality degree.

2. The passenger protection method of claim 1, further comprising:

obtaining, from a first sensor, first data and second data, wherein the first sensor comprises one or more of a seat pressure sensor, a camera, a sound sensor, an air quality sensor, and a temperature sensor, wherein the first data comprises at least one of second in-vehicle seat pressure data, in-vehicle passenger image data, or first in-vehicle passenger voice data, and wherein the second data comprises at least one of in-vehicle environment image data, in-vehicle environment sound data, in-vehicle air quality data, or in-vehicle temperature data;

obtaining, based on the first data, the in-vehicle passenger information; and obtaining, based on the second data, the in-vehicle environment information.

3. The passenger protection method of claim 2, wherein the wake-up signal further comprises second in-vehicle passenger voice data exceeding a preset decibel threshold.

4. The passenger protection method of claim 3, wherein after triggering the passenger protection mode, the passenger protection method further comprises:

operating a vehicle driving system at reduced power consumption;

obtaining, based on the first data, the in-vehicle passenger information during the reduced power consumption;

obtaining, based on the second data, the in-vehicle environment information during the reduced power consumption; and controlling at least one of the driving function to be disabled or the entertainment function to be disabled.

5. The passenger protection method of claim 4, wherein the in-vehicle passenger behavior information comprises an in-vehicle passenger location, an in-vehicle passenger posture, and an in-vehicle passenger facial expression, wherein the in-vehicle passenger location comprises a front seat and a back seat, wherein the in-vehicle passenger posture comprises sitting up, curling up, and lying, wherein the in-vehicle passenger facial expression comprises normal, happy, sad, angry, anxious, or uncomfortable, wherein the in-vehicle passenger voice information comprises an in-vehicle passenger volume, an in-vehicle passenger voiceprint, and in-vehicle passenger voice semantic information, wherein the in-vehicle passenger voice semantic information comprises seeking help, singing, and making a call, and wherein the in-vehicle environment image information comprises normal, fire, and a vehicle accident.

6. The passenger protection method of claim 5, wherein the abnormal state type is the in-vehicle passenger behavior abnormality when the in-vehicle passenger posture is curling up or lying and the in-vehicle passenger facial expression is uncomfortable, wherein the abnormal state type is the in-vehicle passenger voice abnormality when the in-vehicle passenger volume exceeds a first preset decibel threshold corresponding to the in-vehicle passenger voiceprint or the in-vehicle passenger voice semantic information comprises seeking help information, wherein the abnormal state type is the in-vehicle environment image abnormality when the in-vehicle environment image information is the fire or the vehicle accident, wherein the abnormal state type is the in-vehicle environment sound abnormality when the in-vehicle environment sound information exceeds a second preset decibel threshold, wherein the abnormal state type is the in-vehicle air quality abnormality when the in-vehicle air quality data exceeds a preset air quality threshold, and wherein the abnormal state type is the in-vehicle temperature abnormality when the in-vehicle temperature data exceeds a preset temperature threshold.

7. The passenger protection method of claim 6, further comprising:

fusing the in-vehicle passenger information and the in-vehicle environment information in a same time period to obtain fusion information describing a current in-vehicle scenario; and analyzing the fusion information to obtain the abnormality degree, wherein the abnormality degree indicates impact of the current in-vehicle scenario on a passenger.

8. The passenger protection method of claim 7, further comprising:

identifying that the abnormality degree is low when the current in-vehicle scenario described by the fusion information is that a baby is crying;

identifying that the abnormality degree is relatively high when the current in-vehicle scenario described by the fusion information is that the baby is crying and the in-vehicle temperature data is abnormal; and identifying that the abnormality degree is high when the current in-vehicle scenario described by the fusion information is that the baby is crying and the fire breaks out in a vehicle.

9. The passenger protection method of claim 8, wherein the emergency measure comprises emergency communication or an emergency control measure, wherein communication content of the emergency communication comprises one or more of vehicle location information, vehicle appearance information, license plate number information, in-vehicle status information, in-vehicle image data, in-vehicle sound information, status information of a second sensor with abnormal data, or the emergency control measure, wherein a communication manner of the emergency communication is one or more of a Short Message Service (SMS) message, a multimedia message, or a voice call, and wherein the emergency control measure comprises one or more of reminding an in-vehicle passenger using a voice, opening a window, opening a door, opening an in-vehicle air purification device, opening a temperature regulation device, opening a fire extinguishing apparatus, unlocking/opening the door, sounding a horn, or flashing a vehicle lamp.

10. The passenger protection method of claim 9, wherein the emergency measure is the emergency communication when the abnormality degree is low, wherein a first contact of the emergency communication is a first preset emergency contact, wherein the emergency measure is the emergency communication and the emergency control measure when the abnormality degree is relatively high, wherein the first contact is the first preset emergency contact, wherein the emergency control measure is based on the abnormal state type, and wherein the emergency measure is the emergency communication and the emergency control measure when the abnormality degree is high, wherein second contacts of the emergency communication comprise the first preset emergency contact and a second preset emergency contact, and wherein the emergency control measure is based on the abnormal state type.

11. The passenger protection method of claim 10, wherein the emergency control measure is at least one of opening the window, opening the door, or opening the in-vehicle air purification device when the abnormal state type is the in-vehicle air quality abnormality, wherein the emergency control measure is at least one of opening the window, opening the door, or opening the temperature regulation device when the abnormal state type is the in-vehicle temperature abnormality, wherein the emergency control measure is at least one of reminding the in-vehicle passenger using the voice, opening the window, opening the door, opening the temperature regulation device, opening the fire extinguishing apparatus, unlocking/opening the door, sounding the horn, or flashing the vehicle lamp when the abnormal state type is the in-vehicle passenger behavior abnormality or the in-vehicle passenger voice abnormality, and wherein the emergency control measure is at least one of reminding the in-vehicle passenger using the voice, opening the window, opening the door, opening the temperature regulation device, opening the fire extinguishing apparatus, unlocking/opening the door, sounding the horn, or flashing the vehicle lamp when the abnormal state type is the in-vehicle environment image abnormality or the in-vehicle environment sound abnormality.

12. The passenger protection method of claim 3, wherein after triggering the passenger protection mode, the passenger protection method further comprises:
    operating a vehicle driving system at reduced power consumption;
    obtaining, based on the first data, the in-vehicle passenger information during the reduced power consumption; and
    obtaining, based on the second data, the in-vehicle environment information during the reduced power consumption.

13. The passenger protection method of claim 3, wherein after triggering the passenger protection mode, the passenger protection method further comprises controlling at least one of the driving function to be disabled or the entertainment function to be disabled.

14. A computer program product comprising computer-executable instructions that are stored on a non-transitory computer-readable storage medium and that, when executed by a processor, cause an apparatus to:
    automatically trigger, based on driver information, a passenger protection mode in response to a wake-up signal, wherein the wake-up signal comprises first in-vehicle seat pressure data of an in-vehicle passenger exceeding a preset pressure threshold and that continues for more than a preset duration;
    obtain in-vehicle passenger information and in-vehicle environment information after triggering the passenger protection mode, wherein the in-vehicle passenger information comprises one or more of in-vehicle passenger behavior information or in-vehicle passenger voice information, and wherein the in-vehicle environment information comprises one or more of in-vehicle environment image information, in-vehicle environment sound information, in-vehicle air quality information, or in-vehicle temperature information;
    obtain, based on the in-vehicle passenger information and the in-vehicle environment information, an abnormal state type and an abnormality degree, wherein the abnormal state type comprises an in-vehicle passenger abnormality or an in-vehicle environment abnormality, wherein the in-vehicle passenger abnormality comprises one or more of an in-vehicle passenger behavior abnormality or an in-vehicle passenger voice abnormality, and wherein the in-vehicle environment abnormality comprises one or more of an in-vehicle environment image abnormality, an in-vehicle environment sound abnormality, an in-vehicle air quality abnormality, or an in-vehicle temperature abnormality; and
    control at least one of a driving function or an entertainment function based on an emergency measure for reducing the abnormality degree, wherein the emergency measure is based on the abnormal state type and the abnormality degree.

15. A passenger protection apparatus comprising:
a memory configured to store instructions; and
a processor coupled to the memory, wherein the instructions cause the processor to be configured to:
    automatically trigger, based on driver information, a passenger protection mode in response to a wake-up signal, wherein the wake-up signal comprises first in-vehicle seat pressure data of an in-vehicle passenger exceeding a preset pressure threshold and that continues for more than a preset duration;
    obtain in-vehicle passenger information and in-vehicle environment information after triggering the passenger protection mode, wherein the in-vehicle passenger information comprises one or more of in-vehicle passenger behavior information or in-vehicle passenger voice information, and wherein the in-vehicle environment information comprises one or more of in-vehicle environment image information, in-vehicle environment sound information, in-vehicle air quality information, or in-vehicle temperature information;
    obtain, based on the in-vehicle passenger information and the in-vehicle environment information, an abnormal state type and an abnormality degree, wherein the abnormal state type comprises an in-vehicle passenger abnormality or an in-vehicle environment abnormality, wherein the in-vehicle passenger abnormality comprises one or more of an in-vehicle passenger behavior abnormality or an in-vehicle passenger voice abnormality, and wherein the in-vehicle environment abnormality comprises one or more of an in-vehicle environment image abnormality, an in-vehicle environment sound abnormality, an in-vehicle air quality abnormality, or an in-vehicle temperature abnormality; and
    control at least one of a driving function or an entertainment function based on an emergency measure for reducing the abnormality degree, wherein the emergency measure is based on the abnormal state type and the abnormality degree.

16. The passenger protection apparatus of claim 15, wherein the instructions further cause the processor to be configured to:
    obtain, from a first sensor, first data and second data, wherein the first sensor comprises one or more of a seat pressure sensor, a camera, a sound sensor, an air quality sensor, or a temperature sensor, wherein the first data comprises at least one of first in-vehicle seat pressure data, in-vehicle passenger image data, or first in-vehicle passenger voice data, and wherein the second data comprises at least one of in-vehicle environment image data, in-vehicle environment sound data, in-vehicle air quality data, or in-vehicle temperature data;
    obtain, based on the first data, the in-vehicle passenger information; and
    obtain, based on the second data, the in-vehicle environment information.

17. The passenger protection apparatus of claim 16, wherein the wake-up signal further comprises second in-vehicle passenger voice data exceeding a preset decibel threshold.

18. The passenger protection apparatus of claim 17, wherein after triggering the passenger protection mode, the instructions further cause the processor to be configured to:
    operate a vehicle driving system at a preset low frequency that causes the vehicle driving system to reduce power consumption;
    obtain, based on the first data, the in-vehicle passenger information at the preset frequency;
    obtain, based on the second data, the in-vehicle environment information at the preset frequency; and
    control at least one of the driving function to be disabled or the entertainment function to be disabled.

19. The passenger protection apparatus of claim 17, wherein after triggering the passenger protection mode, the instructions further cause the processor to be configured to:
    operate a vehicle driving system at reduced power consumption;
    obtain, based on the first data, the in-vehicle passenger information at the reduced power consumption; and
    obtain, based on the second data, the in-vehicle environment information at the reduced power consumption.

20. The passenger protection apparatus of claim 17, wherein after triggering the passenger protection mode, the instructions further cause the processor to be configured to control at least one of the driving function to be disabled or the entertainment function to be disabled.

* * * * *